Figure 1:
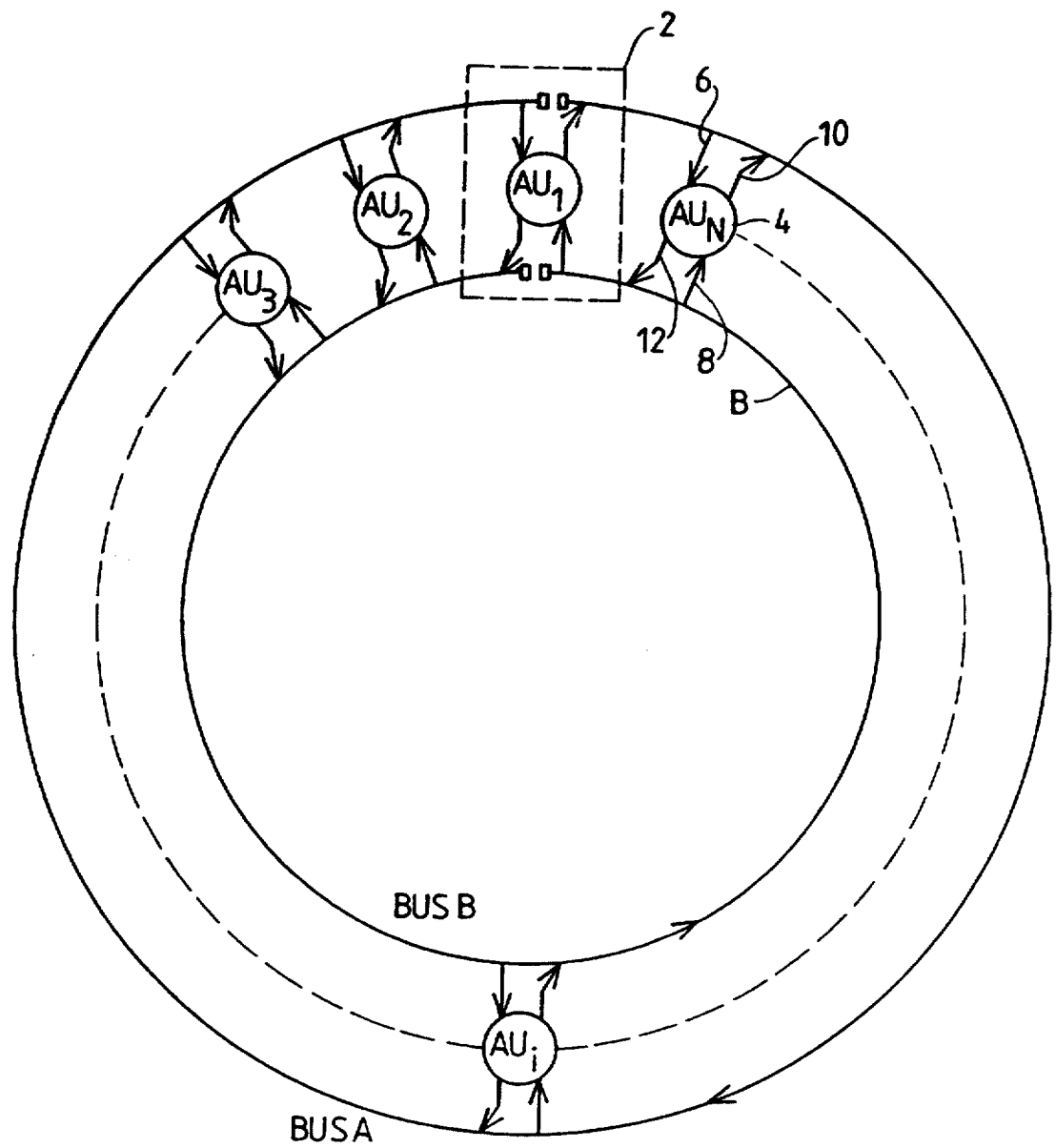

United States Patent [19]

Hullett et al.

[11] Patent Number: 5,351,043

[45] Date of Patent: * Sep. 27, 1994

[54] QUEUEING PROTOCOL

[75] Inventors: John L. Hullett, 75 Selby Street, Daglish, Western Australia; Robert M. Newman, 52 Davallia Road, Duncraig, Western Australia, both of Australia

[73] Assignees: Robert M. Newman; John L. Hullett; The University of Western Australia, Australia

[ * ] Notice: The portion of the term of this patent subsequent to May 1, 2007 has been disclaimed.

[21] Appl. No.: 741,113

[22] Filed: Aug. 6, 1991

Related U.S. Application Data

[63] Continuation of Ser. No. 490,478, Mar. 8, 1990, Pat. No. 5,051,742, which is a continuation of Ser. No. 899,223, Jul. 11, 1986, Pat. No. 4,922,244.

[30] Foreign Application Priority Data

Dec. 3, 1984 [AU] Australia .............................. PG8394

[51] Int. Cl.⁵ ............................................. H04Q 1/00
[52] U.S. Cl. .............................. 340/825.5; 340/825.05
[58] Field of Search ........... 340/825.5, 825.05, 825.51; 370/85.1, 85.2, 85.6, 85.9, 85.12, 85.15, 94.1

[56] References Cited

U.S. PATENT DOCUMENTS

| | | | |
|---|---|---|---|
| 4,161,786 | 6/1979 | Hopkins et al. | 370/85.2 |
| 4,210,780 | 7/1980 | Hopkins et al. | 370/85.2 |
| 4,295,122 | 10/1981 | Hatada et al. | 340/825.5 |
| 4,313,196 | 1/1982 | Oblonsky | 370/85.6 |
| 4,439,763 | 3/1984 | Limb | 370/85.15 |
| 4,500,989 | 2/1985 | Dahod | 370/85.1 |
| 4,532,626 | 7/1985 | Flores et al. | 370/94.1 |
| 4,542,502 | 9/1985 | Levinson et al. | 370/94.1 |
| 4,550,401 | 10/1985 | Spears | 370/85.9 |
| 4,581,735 | 4/1986 | Flamm et al. | 370/94.1 |

*Primary Examiner*—Sandra L. O'Shea
*Assistant Examiner*—Edwin C. Holloway, III
*Attorney, Agent, or Firm*—Blakely, Sokoloff, Taylor & Zafman

[57] ABSTRACT

A method of transmitting data on a communications network having two oppositely directed unidirectional buses (A,B) and a number of access units (4) coupled between buses, the method including the step of establishing a queue which is distributed in the access units and which controls when the access units can transmit data packets on the buses. When an access unit has a data packet (38) queued for transmission on bus A, it sends a REQ bit on bus B. The access units monitor the number of REQ bits passing and empty packets available so as to thereby establish the distributed queue. The access units are able to handle both data packets (38) which are suitable for information from computers and synchronous packets 36 which can be used for voice circuits.

45 Claims, 21 Drawing Sheets

FIG 6A
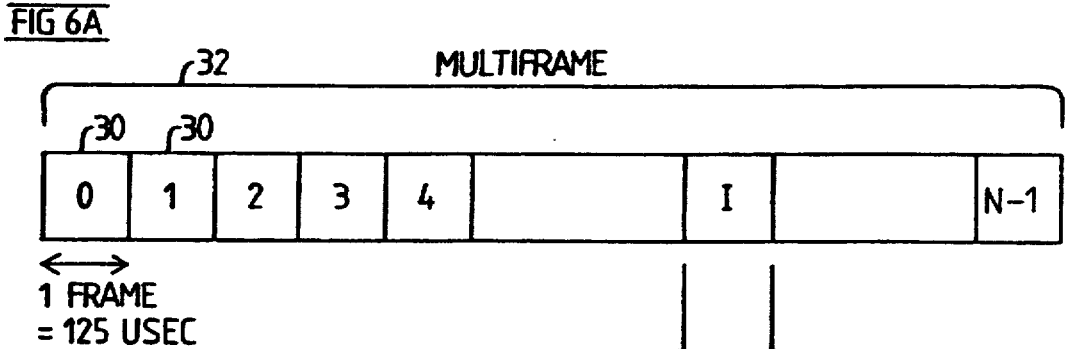
FIG 6B
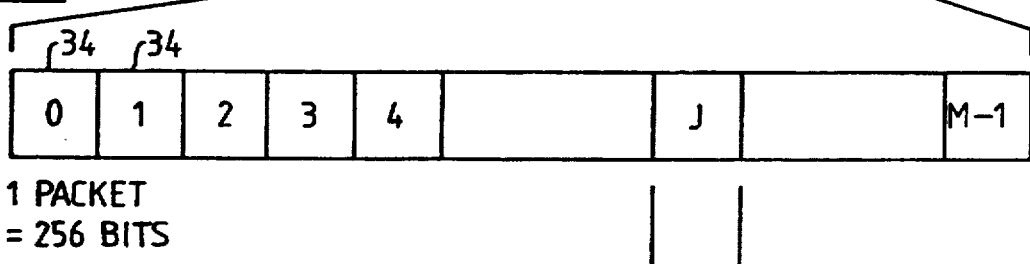
FIG 6C
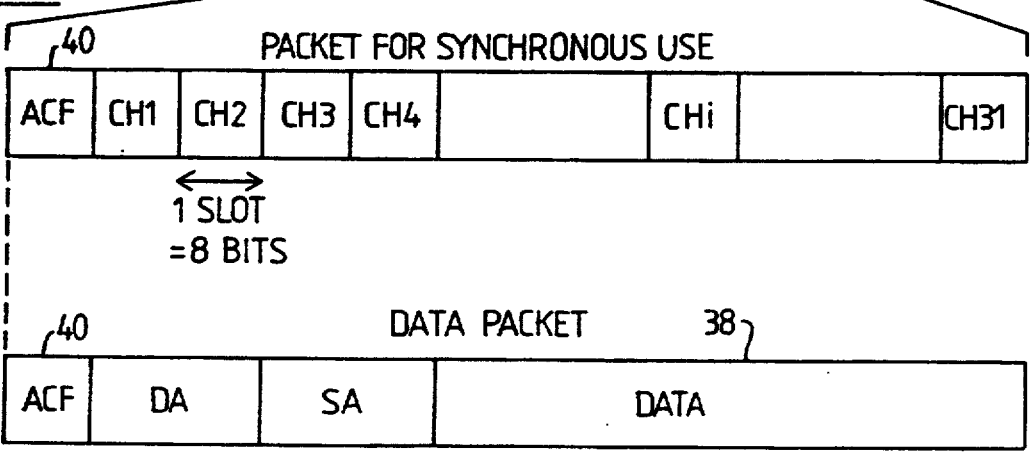
FIG 6D
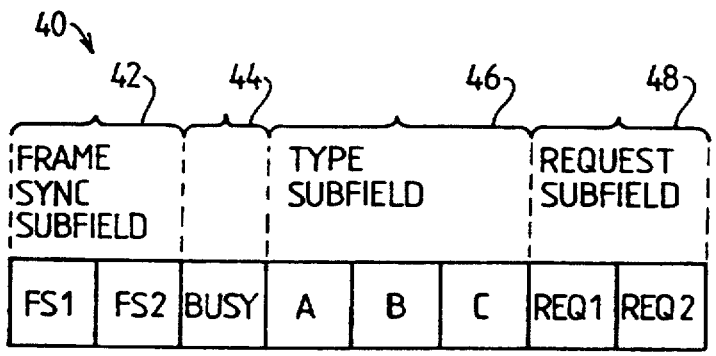
FIG 7

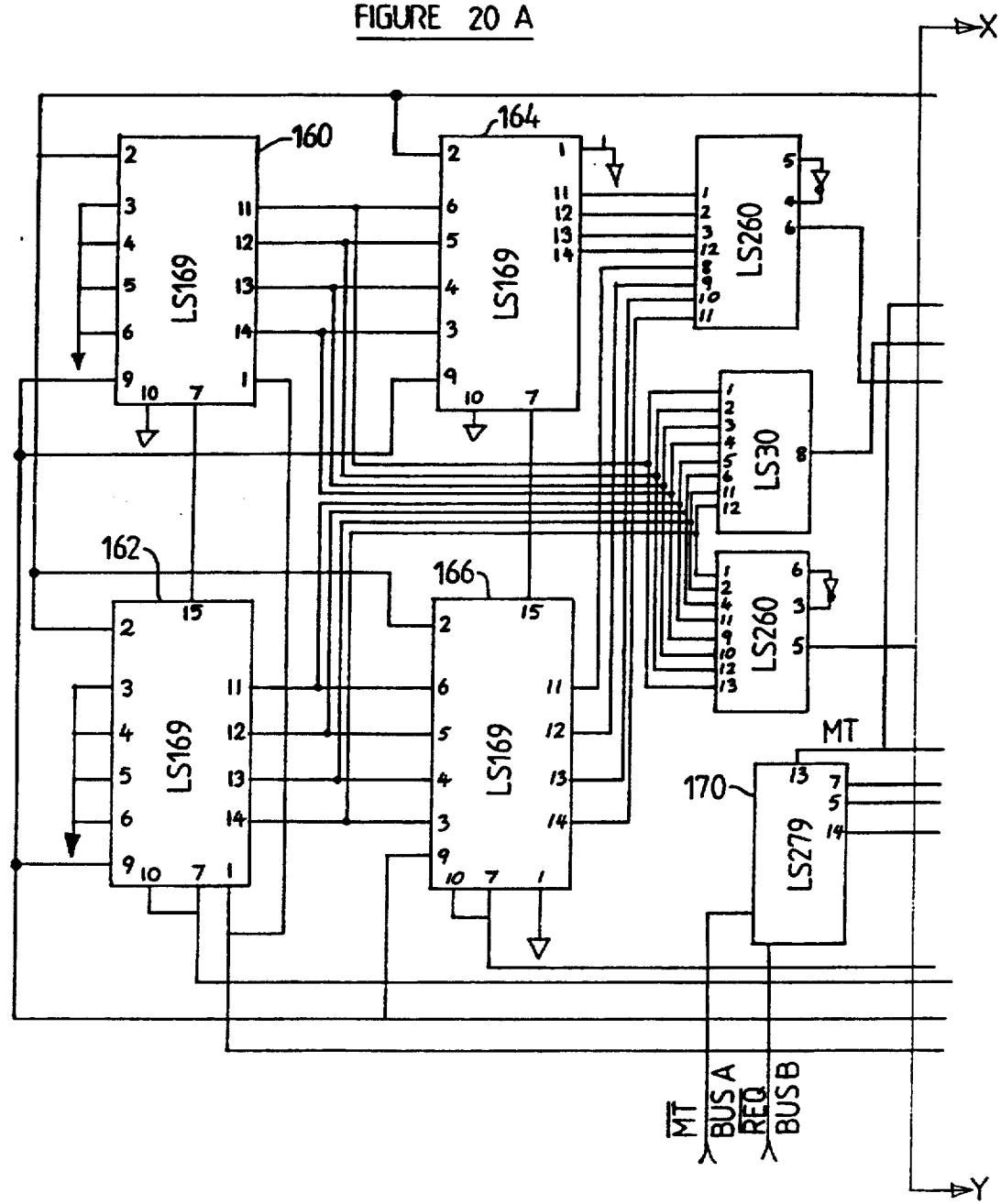

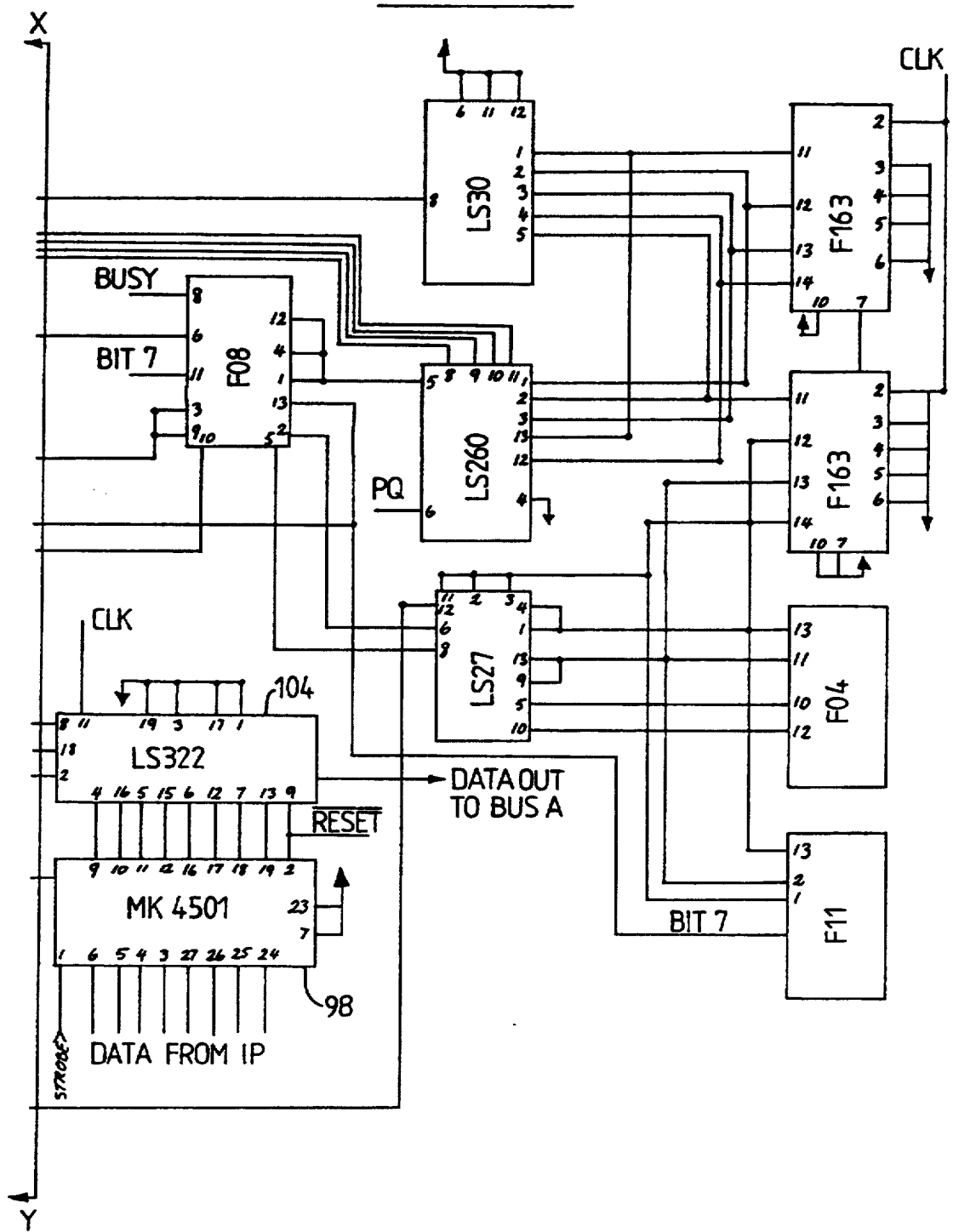

QUEUEING PROTOCOL

This is a continuation of application Ser. No. 490,478 filed Mar. 8, 1990 now U.S. Pat. No. 5,051,742 which is a continuation of Ser. No. 899,223 filed Jul. 11, 1986 now U.S. Pat. No. 4,922,244.

This invention relates to a queueing protocol for controlling access of communication devices to a distributed local network, a centralised switch, or a system which comprises a number of network interconnected switches.

In recent years there has been interest in providing communications networks which are capable of handling a wide mix of traffic such as data, voice, video and facsimile. One proposal suggests the use of a number of stations connected between a pair of unidirectional links, this proposal being published in the Bell System Technical Journal, September 1982 under the title: Description of Fastnet—A Unidirectional Local-Area Communications Network.

Another system is described in a paper entitled "A Packet/Circuit Switch" by Z. L. Budrikis and A. N. Netravali, published in the AT & T Bell Laboratories Technical Journal Vol. 63, No. 8, October 1984. This paper proposes a local network which has access units (AUs) connected between unidirectional buses. An access unit (AU) simply refers to any apparatus which permits communications to and from the unidirectional buses. The AUs are arranged to handle data communications in single length packets as described in Chapter 3.2 of that paper. The same format is proposed for circuit switched packets which refers to synchronous communications such as telephone communications which desirably do not have variable delays in the transmission paths.

Generally speaking, the principal object of the invention is to provide a novel queueing protocol which can be used in a system similar to that proposed by Budrikis and Netravali. As will be apparent from the following description the novel queueing system has very substantial advantages.

According to the present invention there is provided a method of transmitting data on a communications network having first and second unidirectional buses which are oppositely directed and a plurality of access units coupled between the buses, said method including the step of arranging the data to be transmitted from the access units in data packets, and establishing a distributed queue in the network to control the order of data packet transmissions from said access units.

Preferably, the method includes the steps of determining according to destination upon which one of the buses a data packet is to be transmitted from one access unit, transmitting a request flag on the second bus when said one access unit has a data packet for transmission on said first bus, incrementing a request flag counter at said one access unit each time a request flag is detected by said one access unit on said second bus from access units upstream of said one access unit on said second bus decrementing said counter each time an empty data packet is detected by said one access unit on said first bus and transmitting said data packet from said one access unit on said first bus in accordance with the count of said counter.

Preferably further, separate distributed queues are established for data packet transmissions in the respective buses.

Preferably further, each data packet includes a preselected priority flag indicative of N preselected priority levels for data packet transmission and wherein the method includes the step of establishing N separate queues for the respective priority levels, where N is any positive integer.

The invention also provides a communications network for transmission of information in data packets comprising: first and second unidirectional buses which are oppositely directed, a plurality of access units coupled between the buses, each of said access units having at least one counter means therein, the arrangement being such that the contents of the respective counters means are used as a distributed queue to control transmission of data packets on the buses.

Preferably each access unit includes means for determining upon which one of the buses the data packet is to be transmitted according to destination, and wherein the access units include request flag generating means for generating a request flag on the second bus when said access unit has a data packet for transmission on said first bus, and wherein said counter means comprises a request flag counter which is incremented each time a request flag is detected by said access unit on said second bus from access units upstream of said second bus, decrementing said request flag counter each time an empty data packet is detected by said access unit on said first bus and transmitting said data packet on said first bus from said access unit in accordance with the count of said request flag counter.

Preferably the network includes first and second of said counter means each associated with one or other of the buses whereby separate distributed queues are established for each bus.

The invention also provides an access unit for transmission of data packets in a communications system which includes first and second oppositely directed unidirectional buses, said access unit including at least one request flag counter means therein and request flag generating means the access unit being such that, in use, said generating means transmits a request flag on said second bus when the access unit has a data packet for transmission on the first bus and wherein the counter means is incremented each time the access unit detects a request flag on said second bus and decremented each line an empty packet is detected by the access unit on said first bus, said access unit including data packet transmission means which operates to transmit said data packet in accordance with the value of the count in said counter means.

Another object of the invention is to provide novel timing structures for the data packets and synchronous packets for transmission in systems similar to those proposed by Budrikis and Netravali. The proposed timing structures add significant flexibility to the system in respect of handling both the data packets and synchronous packets and for handling packets at considerably different bit rates.

Accordingly, the invention provides a method of transmitting synchronous and data signals on a communications network having two unidirectional buses which are oppositely directed and a plurality of access units coupled between the buses said method including the steps of generating a signal transmission frame having a plurality of signal packets therein, determining whether a signal for transmission from a station is a synchronous signal or data signal, assigning a whole packet for the signal transmission and transmitting only synchronous or data signals during the packet so assigned.

Preferably, the method includes a step of generating a plurality of fixed length slots for each packet, when said packet has been assigned for synchronous signal transmission.

Preferably further, the method includes a step of generating a plurality of data fields for each packet, when said packet has been assigned for data signal transmission.

Preferably further, the first slot in the synchronous packet and the first data field in the data packet comprise and access control field which has the same format for the synchronous and data packets.

Preferably further, the method includes the step of multi-framing by generating a plurality of frames for each multi-frame so as to allow formation of low speed channels by selecting predetermined slots within each multi-frame.

Figure 2:
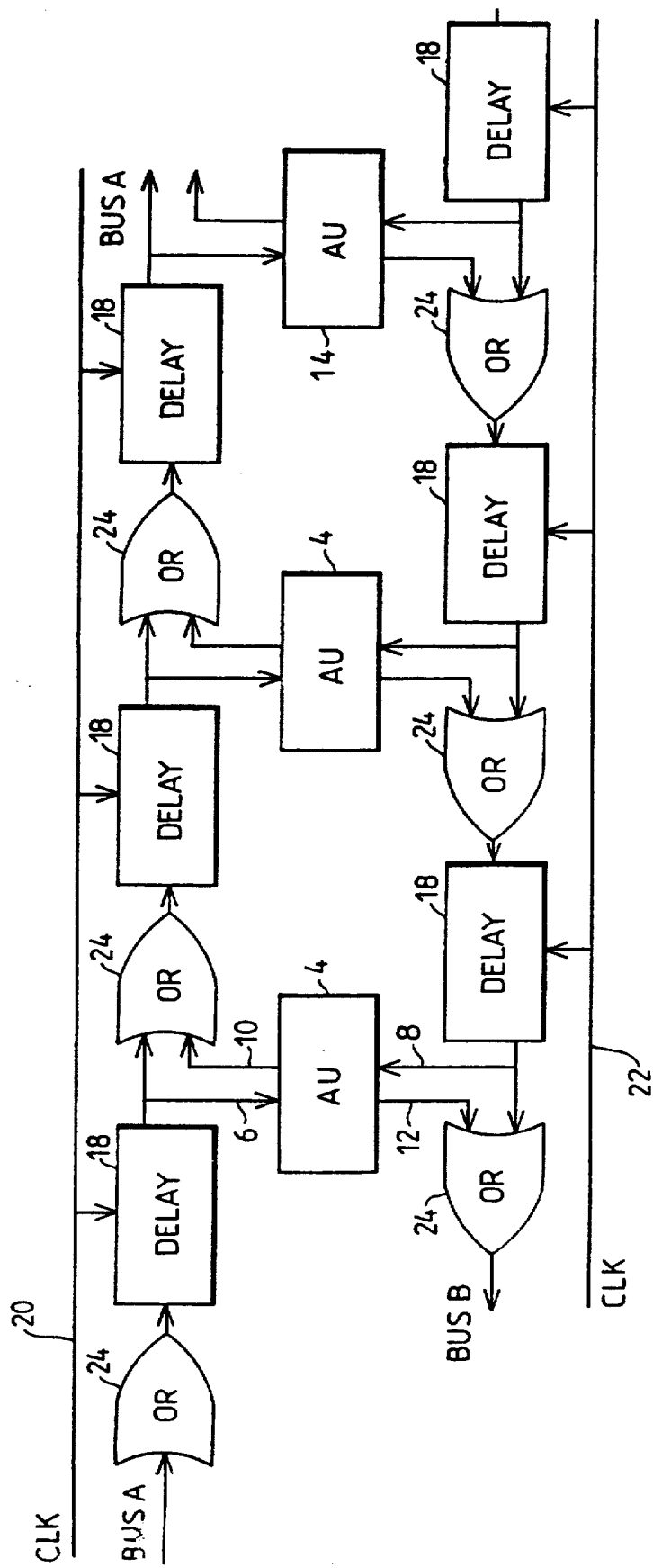
Figure 3:
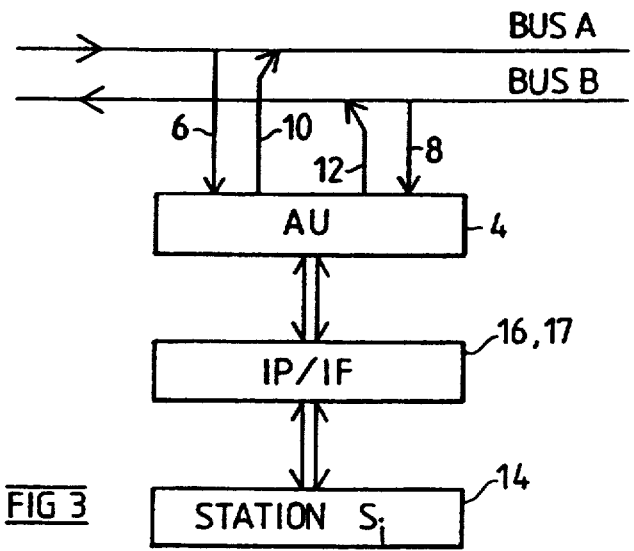
Figure 4:
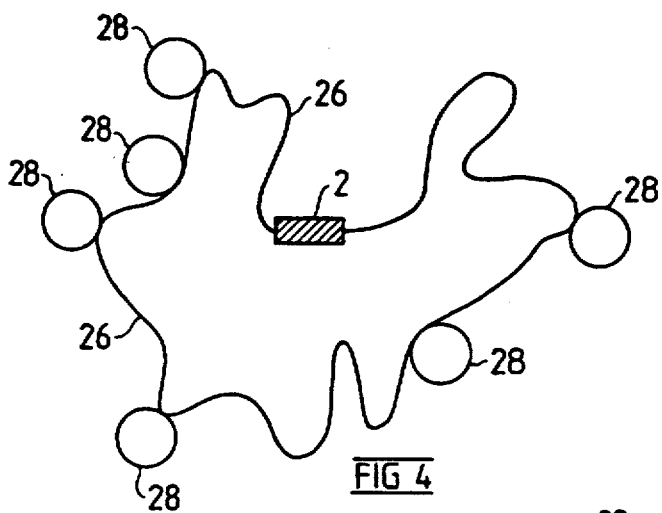
Figure 5:
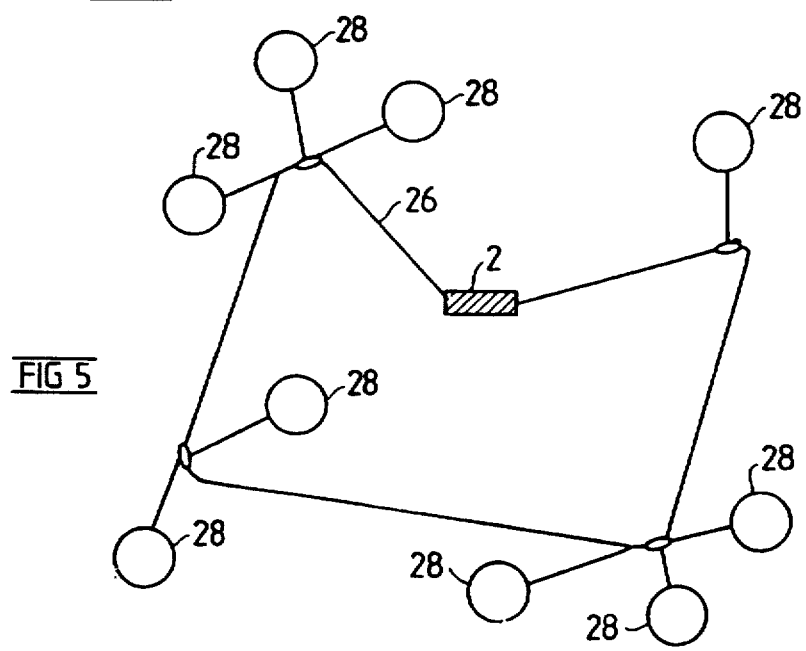
Figure 8:
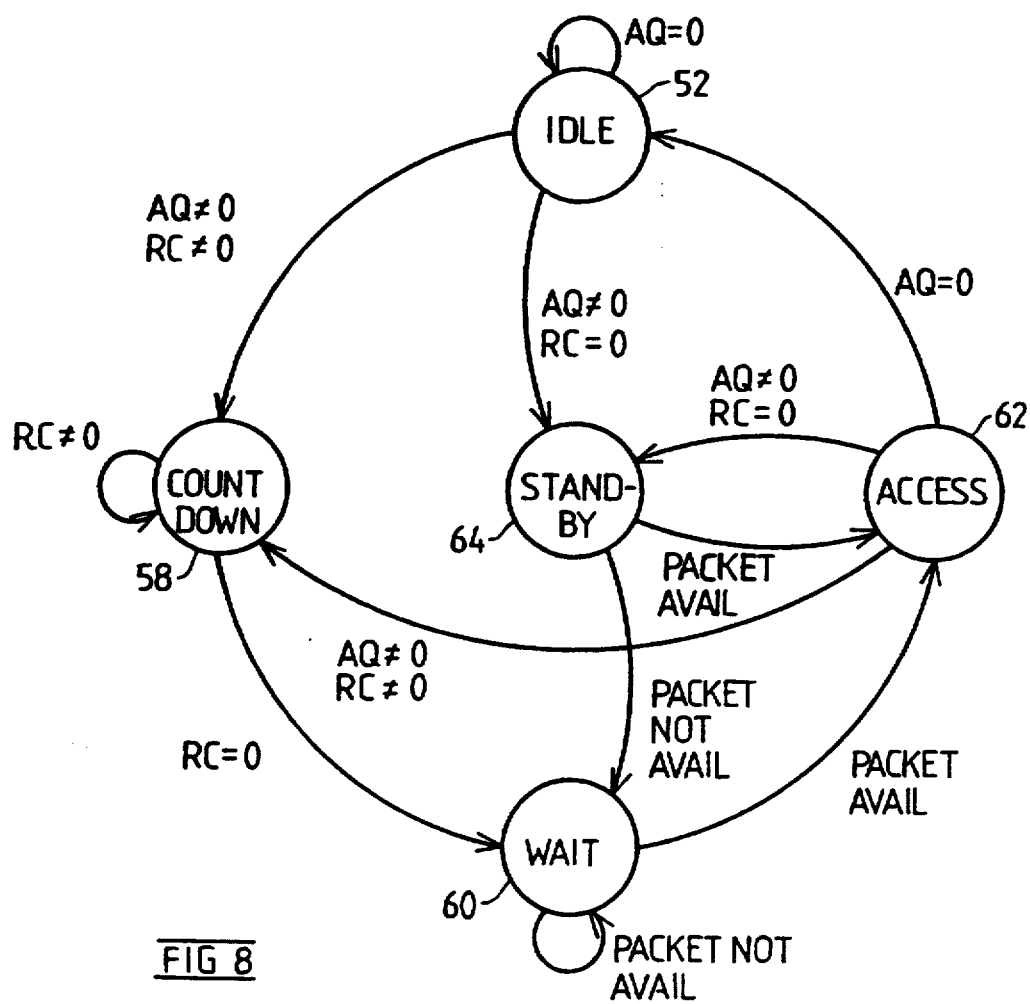
Figure 9:
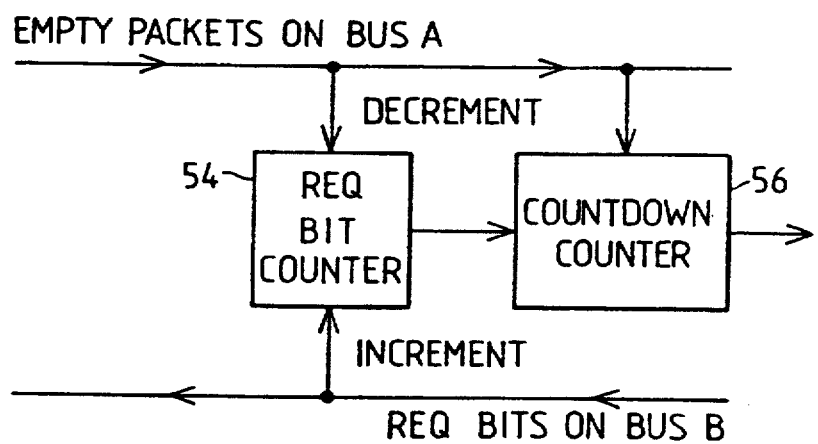
Figure 10:
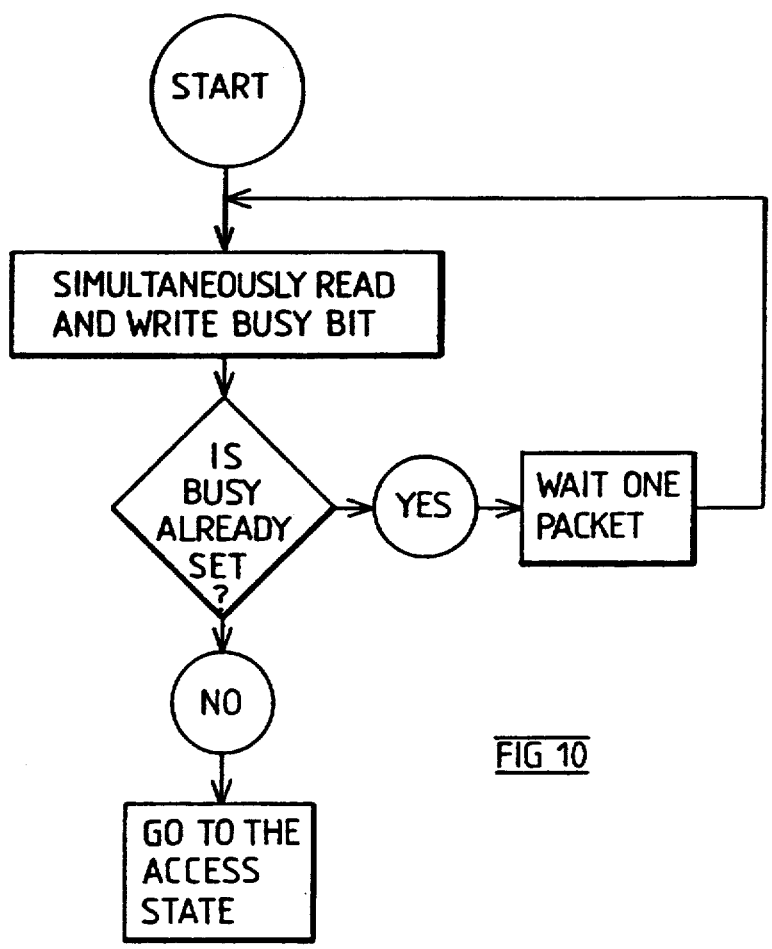
Figure 11:
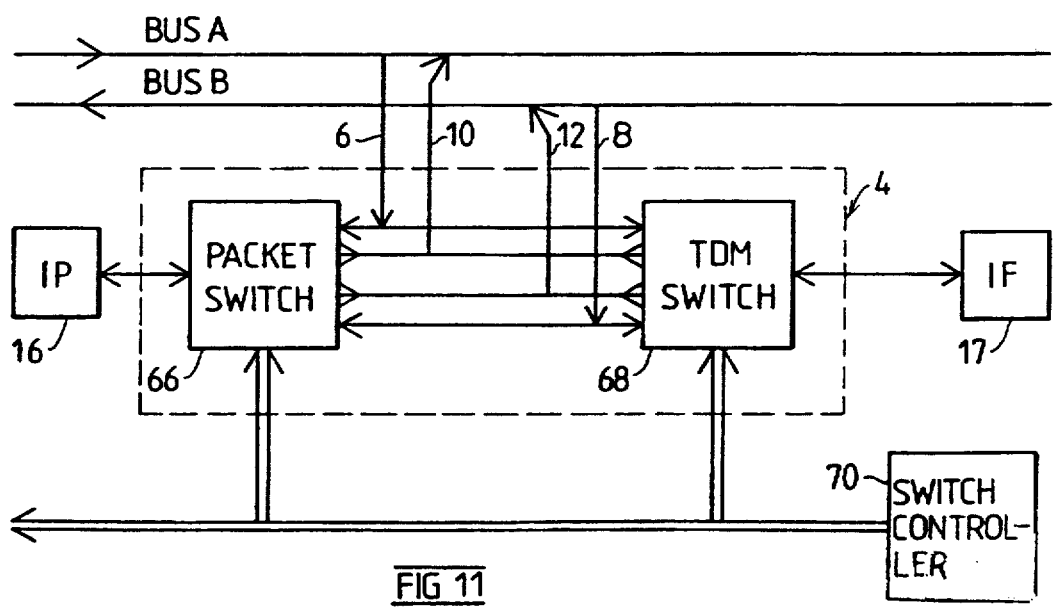
Figure 12:
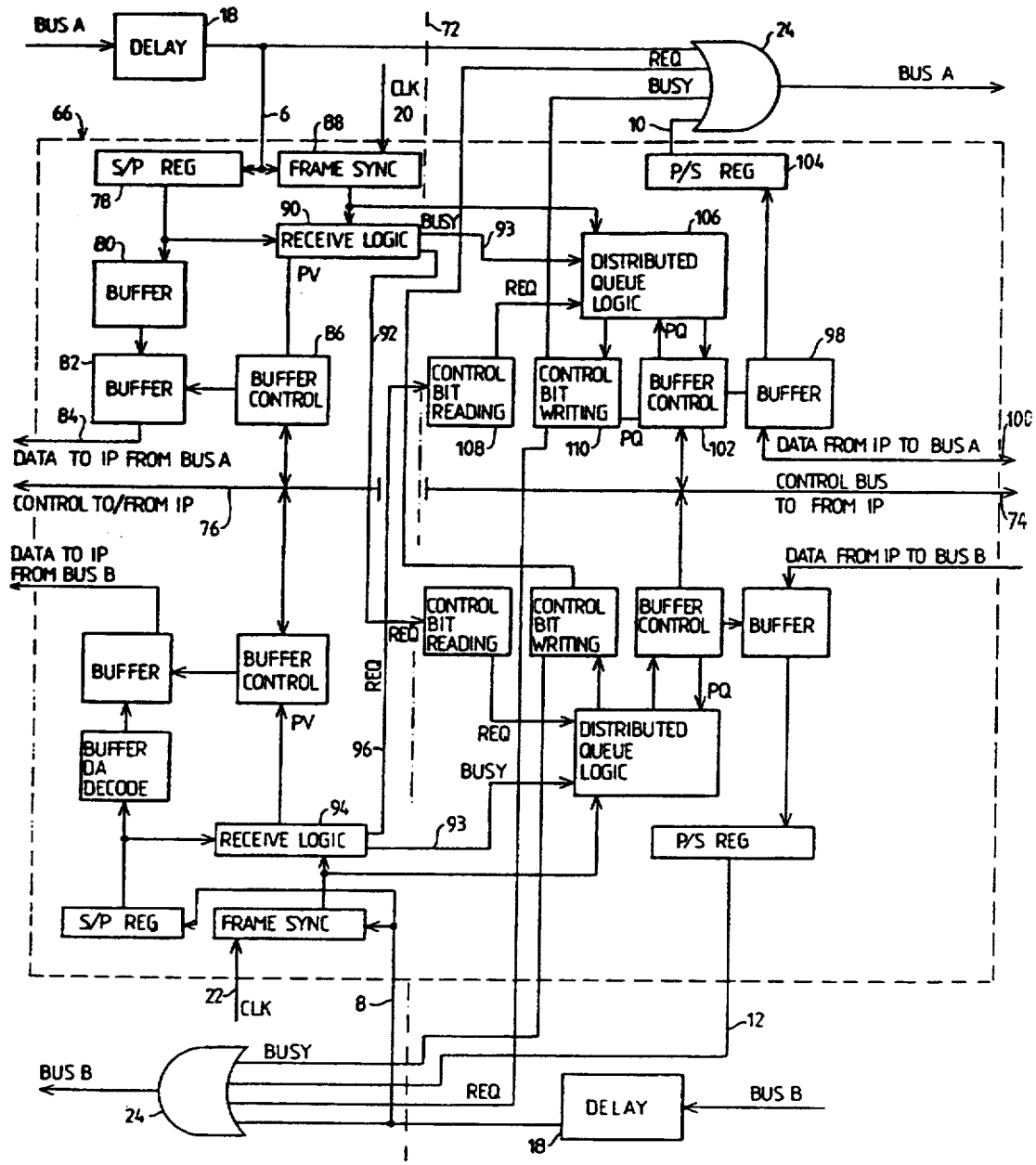
Figure 13:
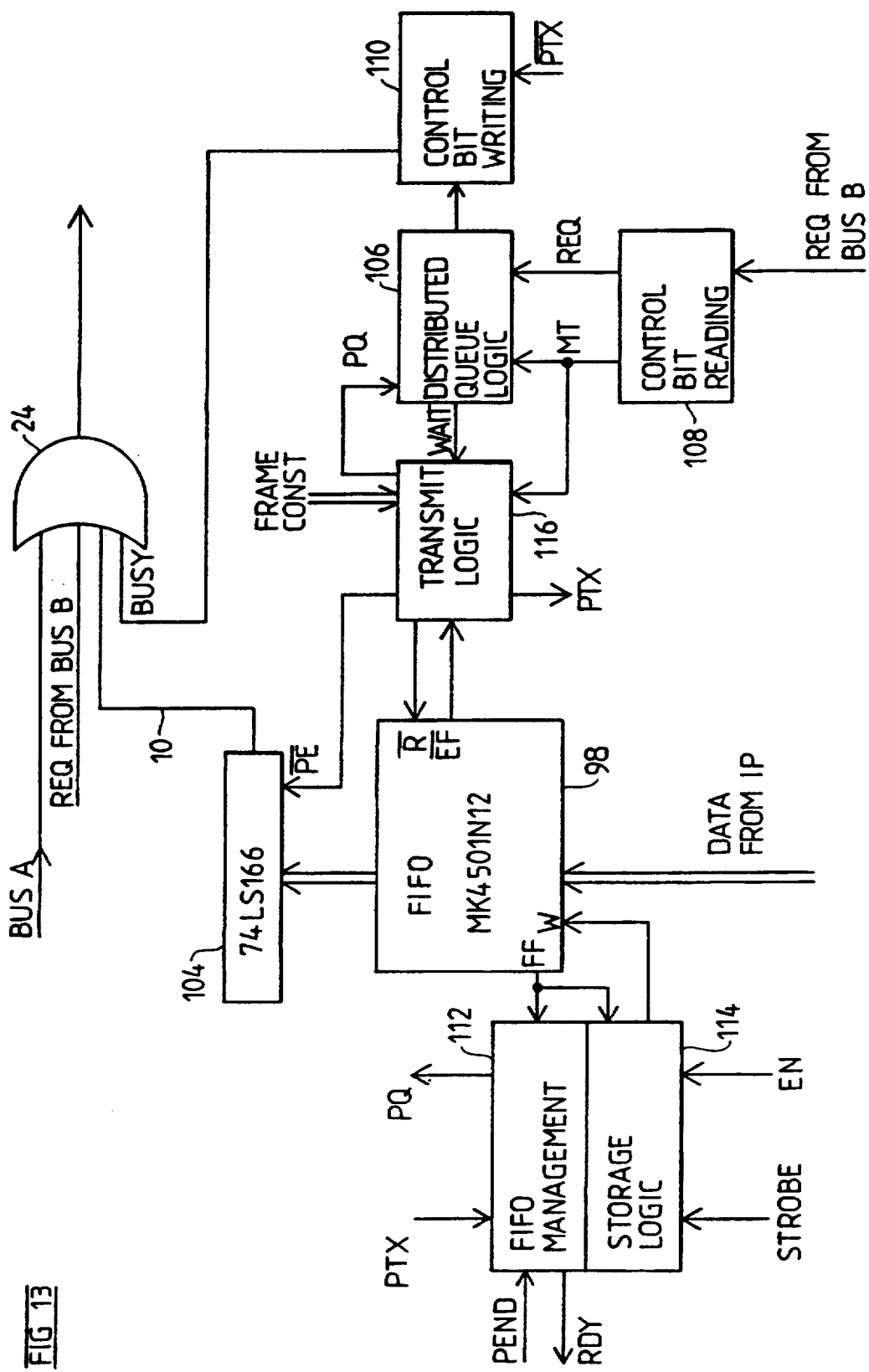
Figure 14:
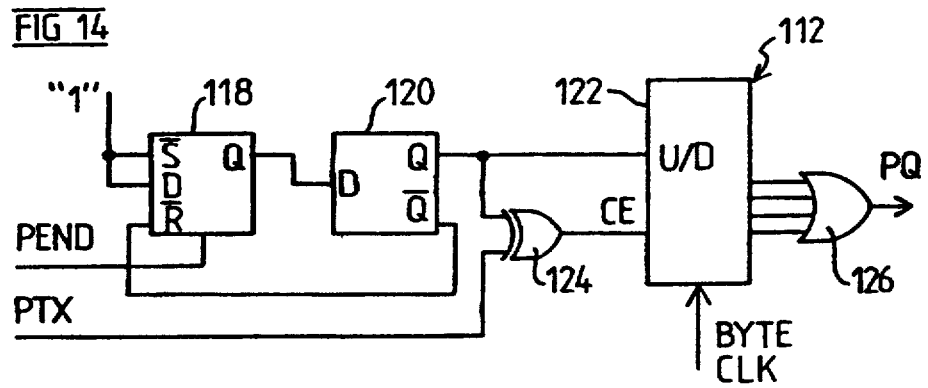
Figure 15:
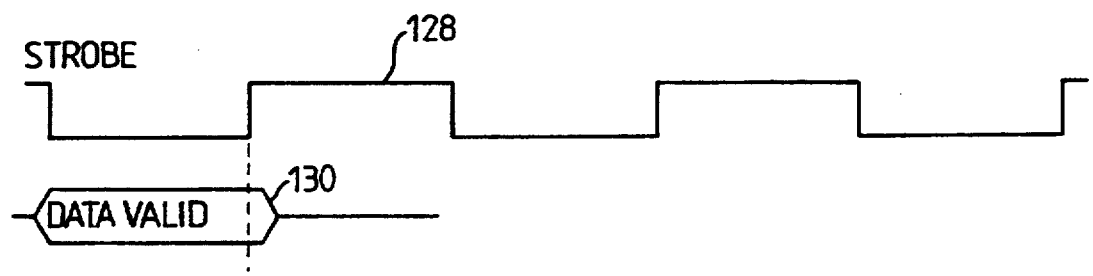
Figure 16:
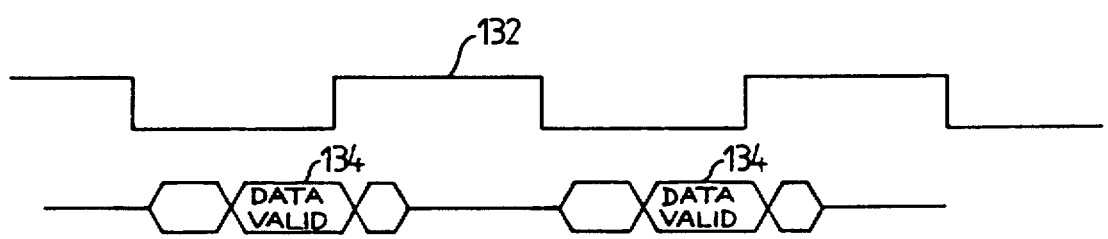
Figure 17:
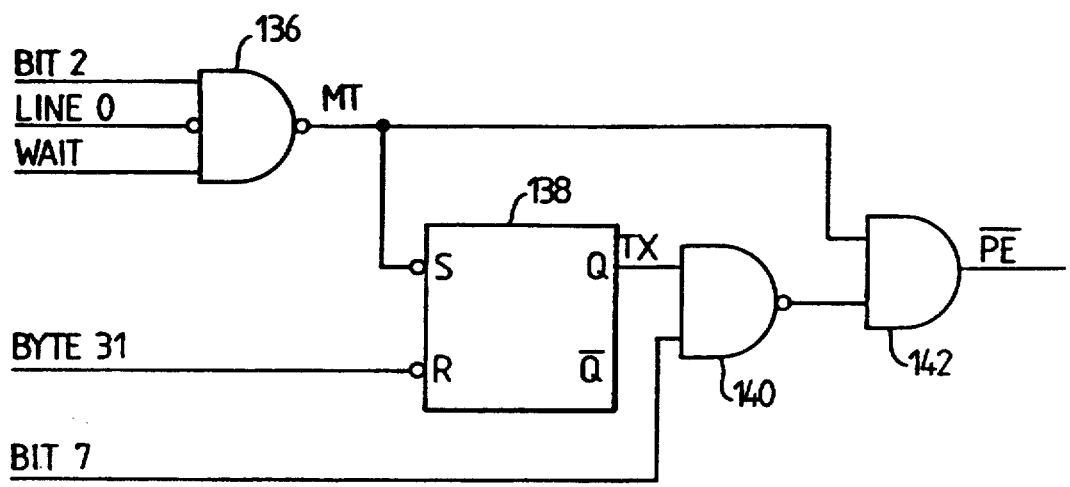
Figure 18:
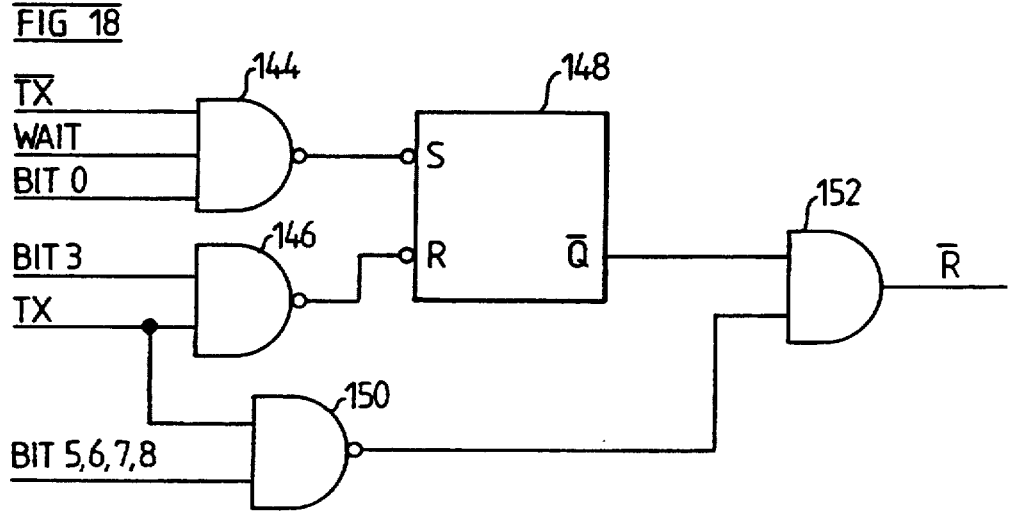
Figure 19:
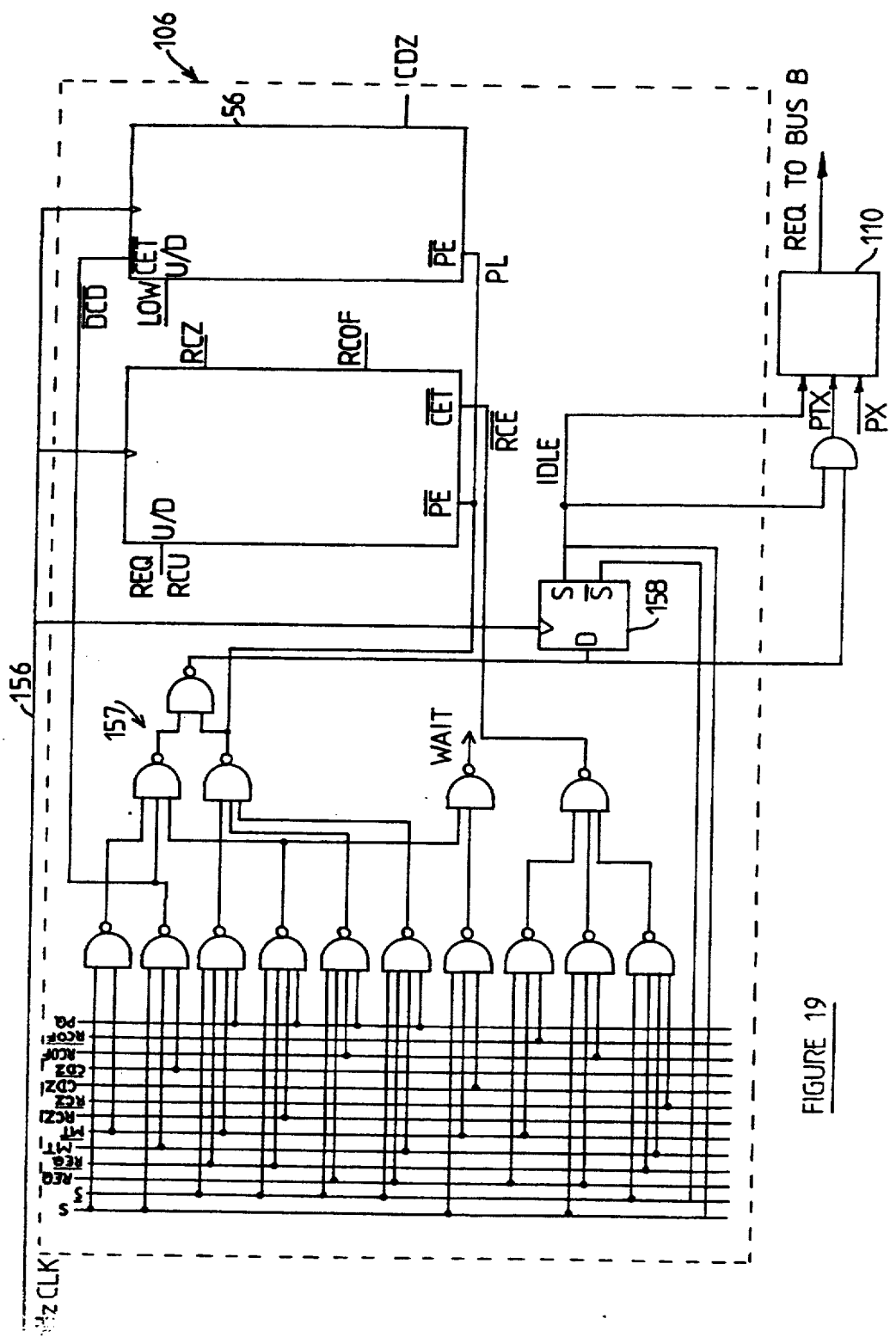
Figure 20B:
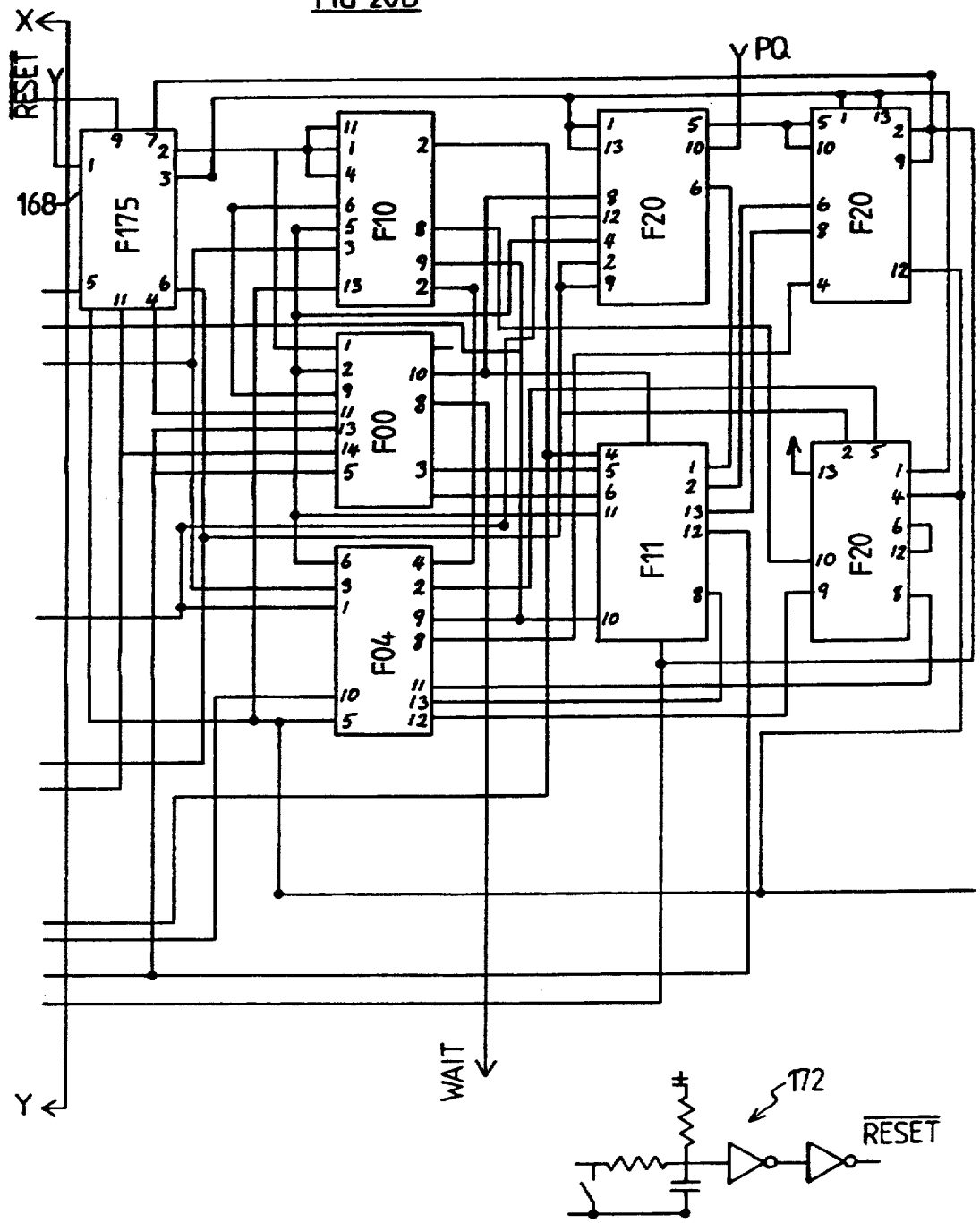
Figure 21:
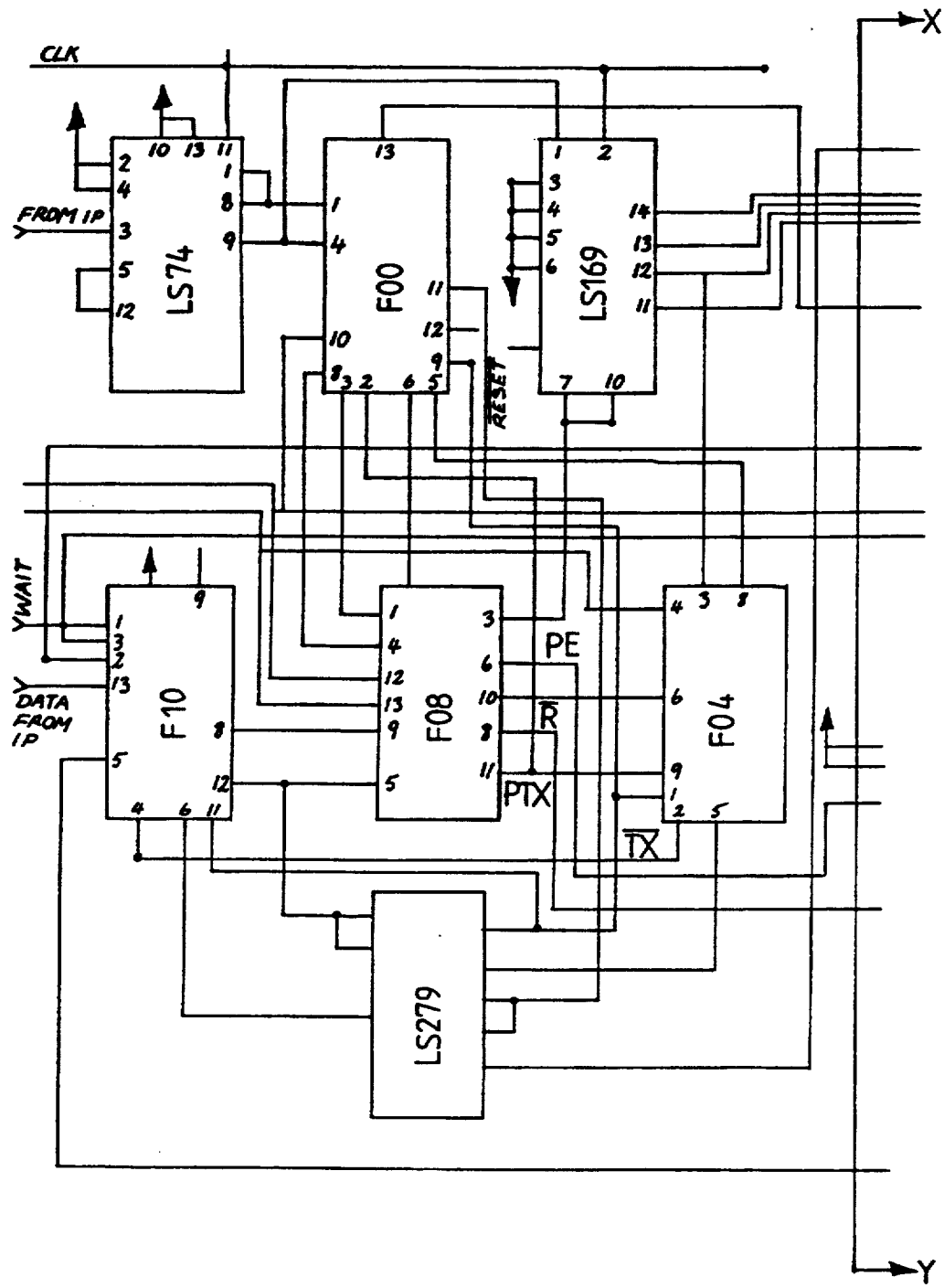
Figure 22:
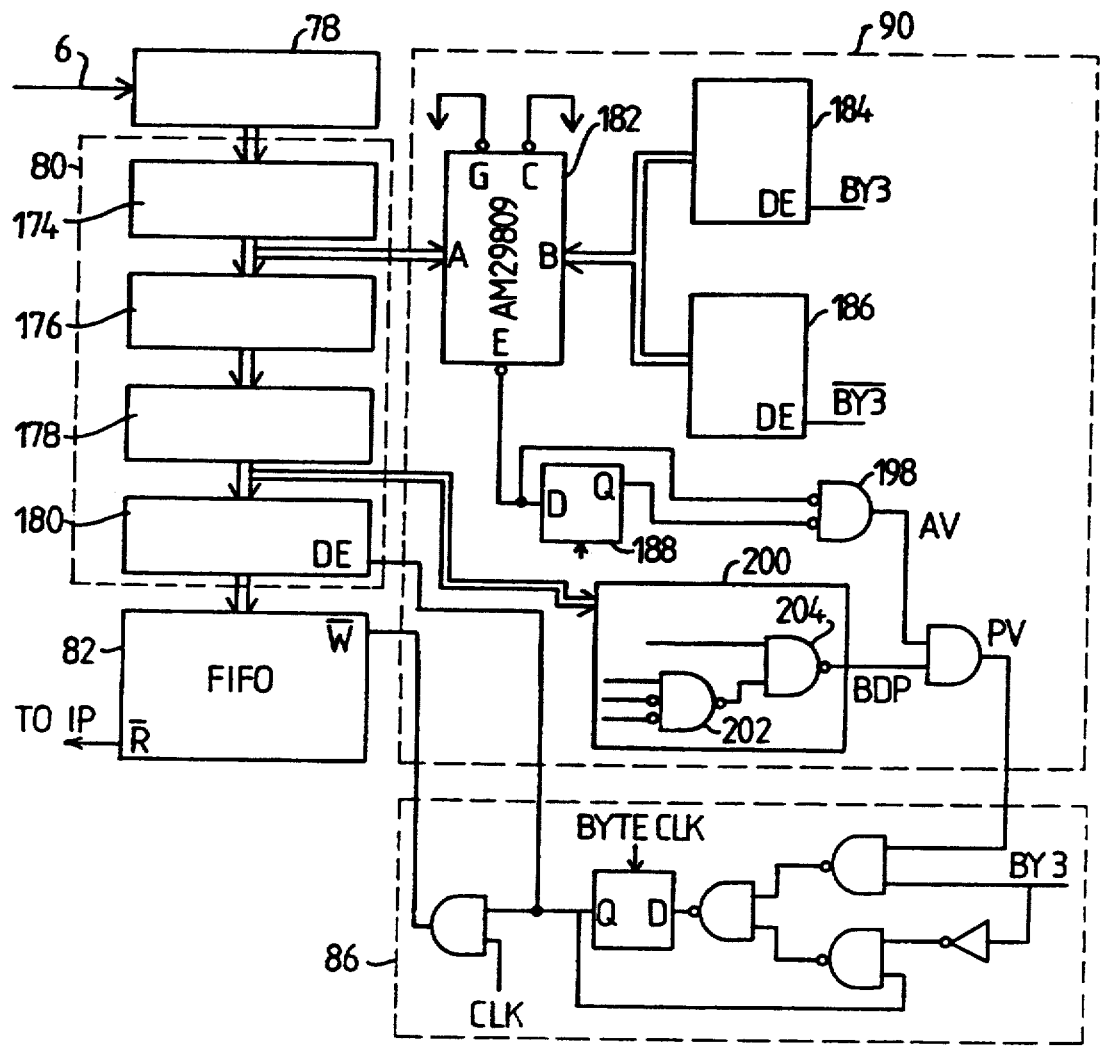
Figure 24A:
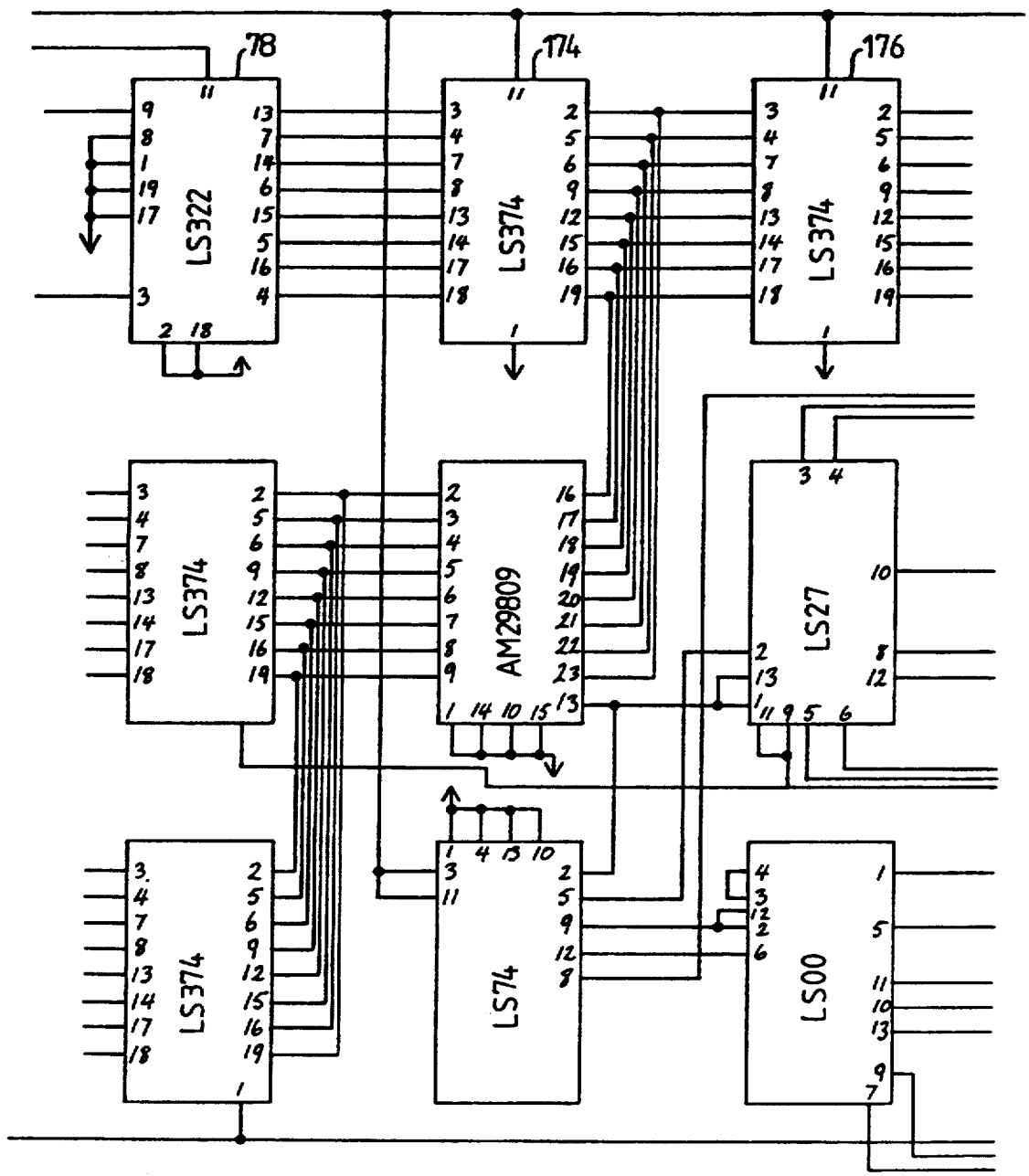
Figure 24B:
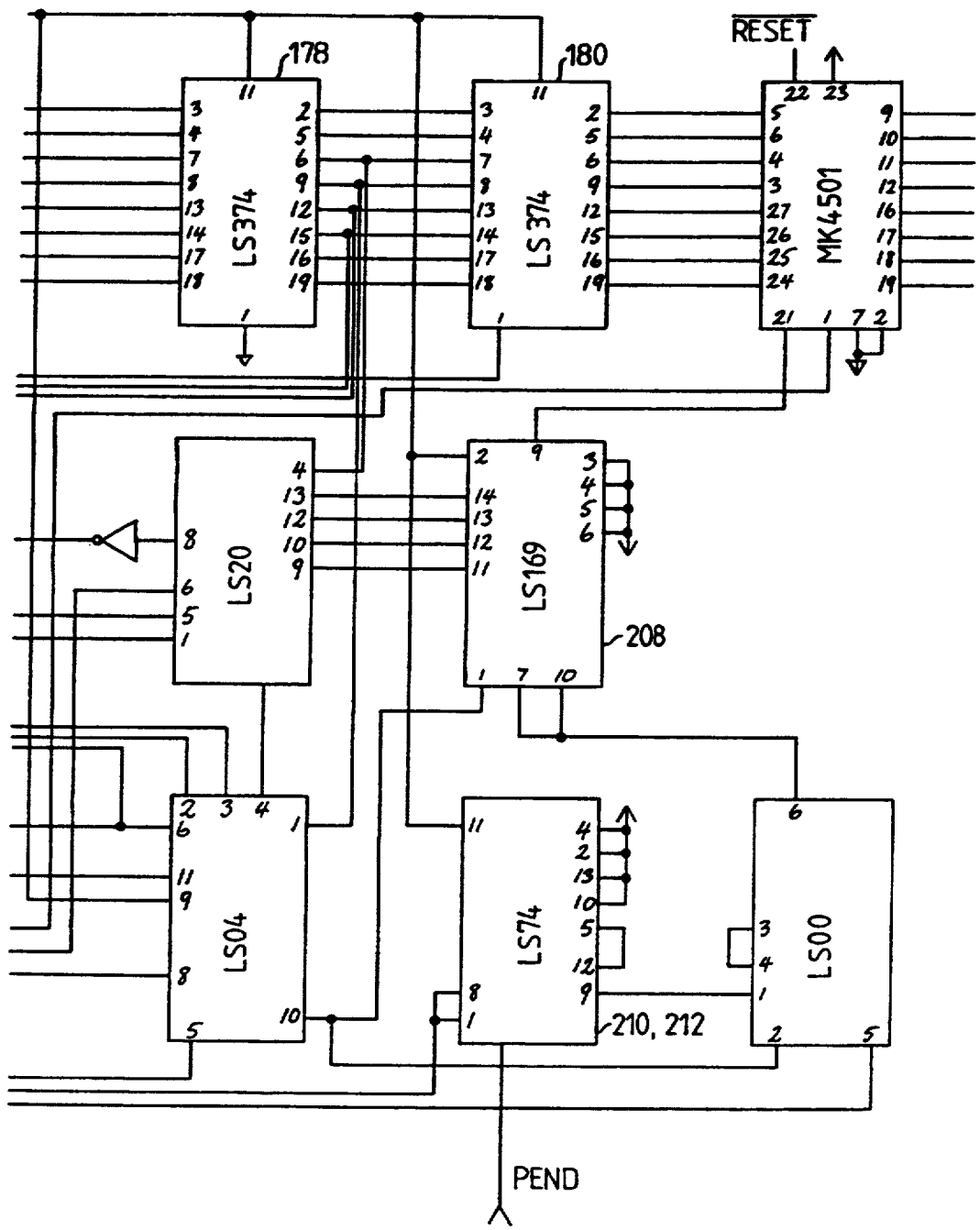
Figure 23:
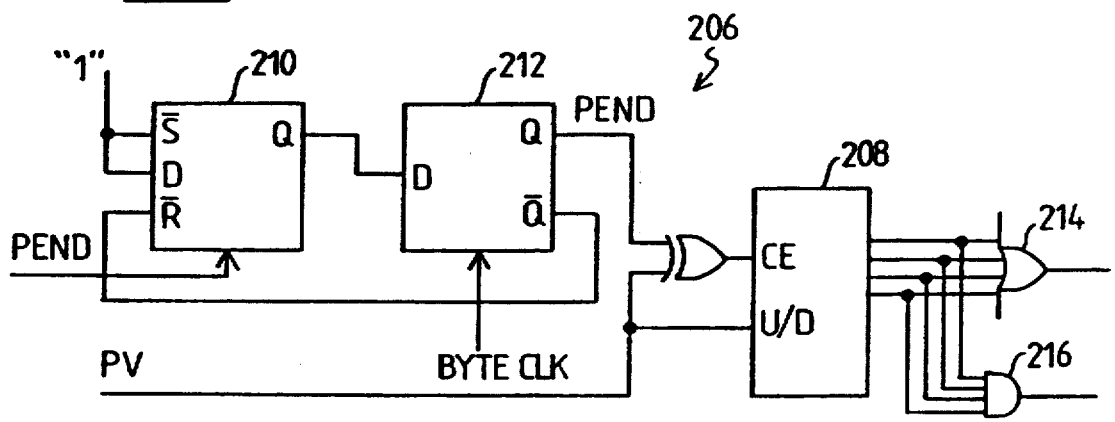
Figure 25:
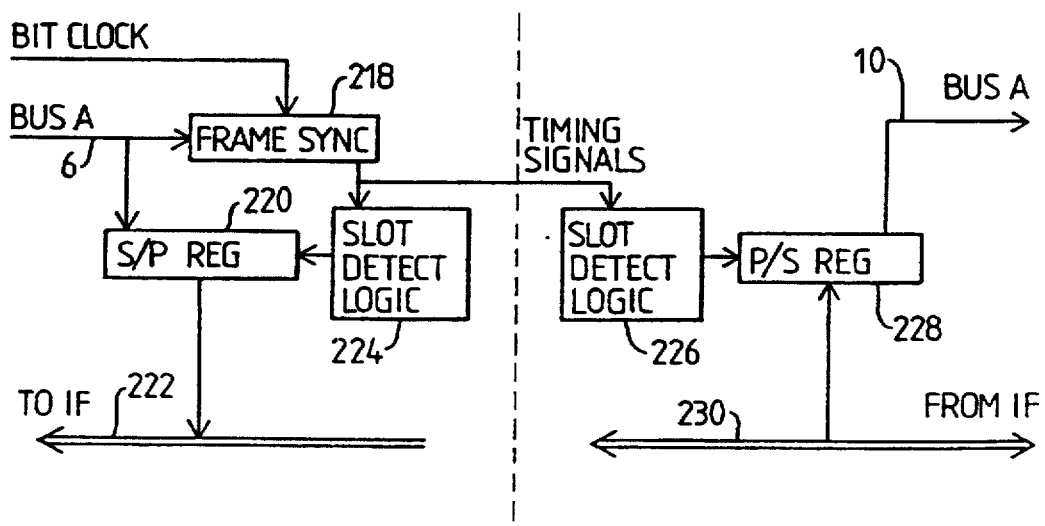
Figure 26:
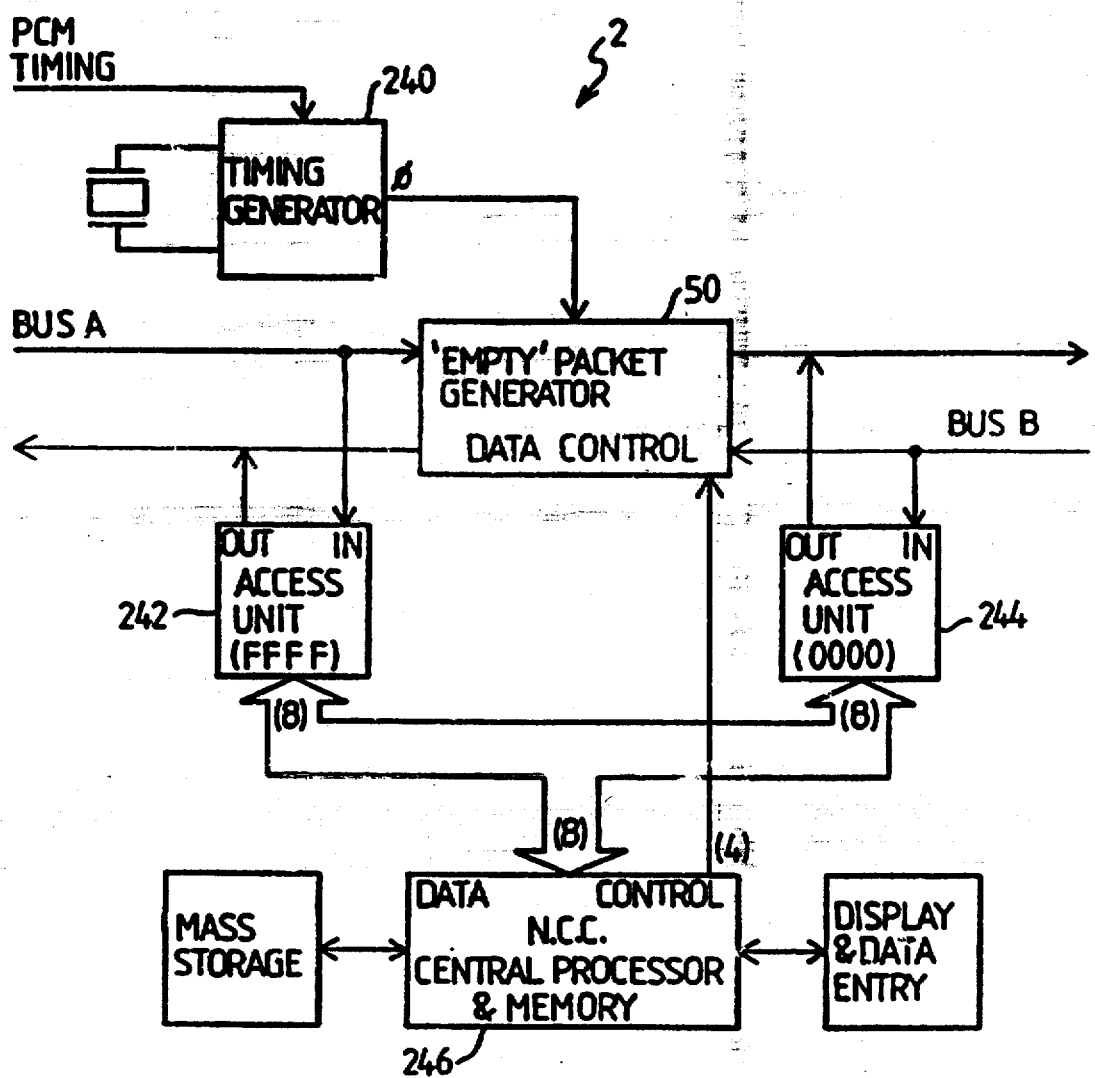
Figure 27:
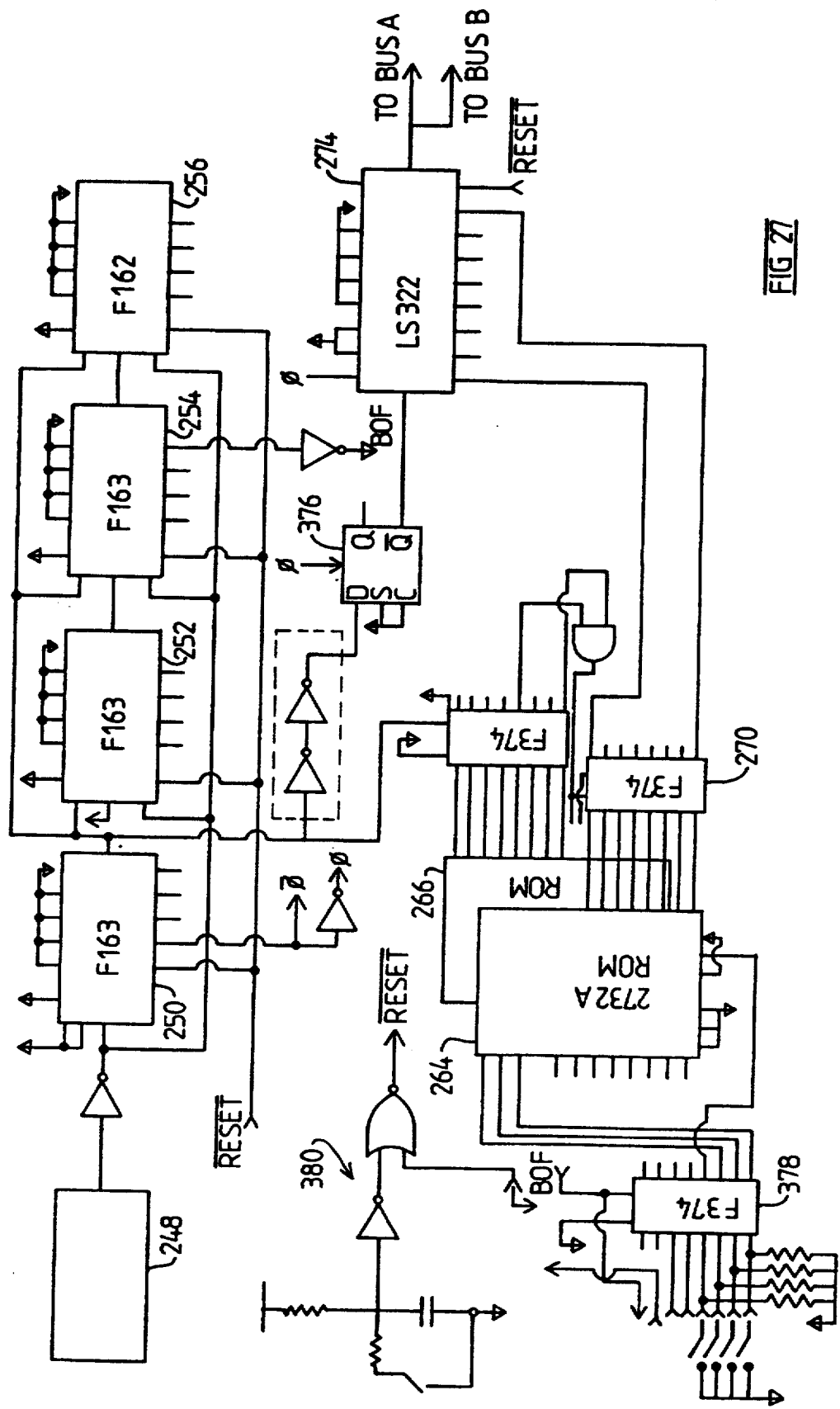

The invention will now be further described with reference to the accompanying drawings, in which:

FIG. 1 is a schematic representation of a switch or looped unidirectional bus network, FIG. 2 is a schematic representation of a shift register bus, FIG. 3 is a block diagram showing connection of a station to an access unit (AU), FIG. 4 shows a distributed network architecture, FIG. 5 shows a clustered network topology, FIGS. 6A to D show timing structures for packets in accordance with the invention, FIG. 7 shows an access control field (ACF), FIG. 8 shows a state transition diagram for data packet transmission of the distributed queueing protocol of the invention, FIG. 9 diagrammatically illustrates a step in the distributed queueing protocol, FIG. 10 is a flow chart for part of the distributed queueing protocol, FIG. 11 is a simplified block diagram of an AU, FIG. 12 is a more detailed diagram of an AU coupled between unidirectional buses, FIG. 13 shows in more detail part of the block diagram of an AU, FIG. 14 is a circuit diagram for part of the buffer control circuit, FIG. 15 is a timing diagram for the storage logic, FIG. 16 is a timing diagram for the transmit logic, FIG. 17 shows the transmit logic circuit, FIG. 18 shows the logic circuit to read from the transmit buffer, FIG. 19 shows the distributed queue logic, FIGS. 20A and B which join at the line X-Y show a circuit for realisation of the distributed queue logic, FIGS. 21A and B which join at the line X-Y show a circuit realisation for the transmit buffer and associated circuitry, FIG. 22 shows a logic diagram for the receive side of the access unit, FIG. 23 shows a circuit diagram for counter logic for packet storage, FIGS. 24A and B which join at line X-Y show a circuit realisation for the receive side of the access unit, FIG. 25 is a simplified block diagram of the timed division multiplexer switch, FIG. 26 is a simplified schematic diagram of the central controller and FIG. 27 is a circuit diagram for the empty packet generator of FIG. 26.

A complete QPSX switching architecture is shown in FIG. 1. The expression QPSX denotes a switch which has in accordance with the invention queued packet and synchronous circuit exchange, hence the acronym QPSX. The switch comprises two unidirectional buses, bus A and bus B with data flowing in opposite directions, a central controller 2 and a number of distributed access units (AUs) 4 coupled between the buses A and B. Although each bus originates and terminates at the central controller 2 neither has a through connection, in normal circumstances. Each AU 4 has read taps 6 and 8 from the respective buses and lines 10 and 12 connected to unidirectional write couplers to the respective buses. The write couplers transmit only in the direction of propagation of the respective buses. The read connections for each AU are attached to the bus ahead of the write connections and consequently the information read by each AU is uneffected by that written by it.

The unidirectional flow of information on the multi-tapped buses enables each to be operated synchronously and this provides the necessary basis for circuit switching for voice. For each AU a two-way communication facility is available through the appropriate choice of bus. Either bus may be used by an AU for communicating with the central controller 2.

All synchronisation, from bit through frame to multi-frame, as illustrated in FIGS. 6A to D, is provided by the central controller 2. The central controller allocates synchronous channels on request from AUs connected to the buses. These requests are packet switched. In addition to this synchronous circuit allocating function, the central controller performs bus and AU error monitoring and control functions. The unidirectional transmission gives a unique physical address to the terminal equipment (not shown) at a station 14 connected to the AU by a station interface 16 or 17. For a data processing station, the interface is referred to as an IP 16 whereas for a station requiring synchronous connection such as a telephone the interface is referred to as an IF 17.

In relation to data transmission, the AU controls the access of its own data package to the buses. Since timing control exercised by the central controller of may be assumed by any other AU, the control of packet switching within the QPSX is fully distributed.

The QPSX switch shown in FIG. 1 may have the AUs 4 grouped together in clusters which are interconnected by unidirectional transmission lines 26 such as optical fibres. Alternatively, the AUs may be individual and be interconnected by the transmission lines.

FIG. 2 shows a particularly convenient arrangement for realisation of the buses A and B for clustered AUs, the arrangement being similar to that described in the aforementioned paper by Budrikis and Netravali. Here the unidirectional buses A and B comprise serially connected shift registers 18 with the number of shift registers in each bus equal to the number of AUs. This arrangement has the advantage that each of the shift registers would share a common clock signal CLK on lines 20 and 22. The read taps 6 and 8 for a particular AU are connections to the outputs of the shift registers of the previous stage. Writing is accomplished by using couplers in the form of OR gates 24 serially connected between the shift registers and having the write lines 10 and 12 inputted thereto. The arrangement of FIG. 2 is particularly useful since the AUs and parts of the buses A and B could be integrated using VLSI techniques.

FIG. 4 shows a fully distributed network in which portions of the buses would be implemented by physical transmission lines 26 covering the local area with the AU connection based on station location. Connections to the transmission line may be either active or passive. Active connections would incorporate a receiver, regenerater and transmitter in the signal path. On the other hand, passive connections for copper cables would be made with high impedance read tap and directional coupler write tap. For optical fibre cables, both read and write connections would be via directional couplers which are known per se. The network arrangement with passive connections may be similar to that used in a number of existing local area networks particularly those where implicit token passing protocols are employed. In these, the transmission is generally over coaxial cable and the technology used is similar to that for CATV.

FIG. 5 shows a cluster or distributed star topology. Here the AUs 4 are connected in groups linked by paired transmission lines 26 as in the distributed network of FIG. 4. Consequently, the buses A and B may take the form as illustrated in FIG. 2 at the connected clusters of AUs, the transmission lines 26 extending between the clusters of AUs. The buses A and B are looped to the central controller 2 as in FIG. 1.

The clustered network topology of FIG. 5 has many attractive features making it ideal for serving a local area. One of significance is its efficient and secure usage of trunking cable which is run point to point between cluster cabinet locations. Cabinets (not shown) could for example be housed on each floor of a building complex whereby trunking cable would be used in riser shafts and between buildings. The AUs would be located within the cabinets with cable of the appropriate capacity starwiring these to either IP's or interfaces IF's. The trunking cable is preferably optical fibre which has the advantages of small physical size, low cost, high capacity and is particularly suited to point to point use.

Since the AUs are located in clusters, the clock timing signal detection and cable transmission equipment may also be shared the transmission lines 26 in the clustered network has no distributed tapping points and consequently is capable of very high speed operation. It is envisaged that an integrated AU could be used at various speeds of operation from say 16.384 Mbps 500 Mbps and beyond. The requirement for a high capacity network may arise either by growth in the number of AUs connected as the number of users grows, or the facilities provided to each user become more sophisticated. Generally speaking, expansion of a network using QPSX switching is very simple because the additional capacity can be provided by increasing the bit rate or by running parallel buses. Moreover, additional AUs can be added easily, if required.

FIGS. 6A to D show the timing structures used in QPSX switching in accordance with the invention. For circuit switched or synchronous communications, it is preferred to use a base rate of 64 kbps digital channels for voice and general purpose synchronous channels at rates above and below this. The very low bit rate channels could for example be used for such functions as security and fire-alarm monitoring, while the high bit rate channels would be used for high fidelity sound, visual signals and the like. On the other hand, for packet switched data communications the timing structure provides for fixed length packets and the arrangement is such that all packets not currently reserved for circuit use are available for data. All communications at the physical layer of a network as shown in FIGS. 4 or 5 are completely synchronous i.e. on the buses, the bits transmitted on the bus are locked into synchronism at every station with respect to bit rate and framing. The synchronous bit streams on each bus are grouped into frames 30 and larger multi-frames 32 which provide the repetitive time structure necessary for synchronous circuits. The frame period is preferably 125 $\mu$s to suit the 8 KHz sampling rate used with PCM voice encoding.

Division of the 125 $\mu$s frame into fixed length packets 34 provides for the integration of synchronous and data traffic. Packets 34 can either be allocated by the central controller 2 for synchronous circuits or left free for data communications. A synchronous packet 36 is diagrammatically illustrated in FIG. 6C and a data packet 38 is diagrammatically illustrated in FIG. 6D. Both the synchronous and data packets 36 and 38 have an access control field (ACF) 40 which includes a TYPE subfield 46 therein which indicates whether the packet which follows is synchronous or data. This arrangement allows for the dynamic allocation of synchronous packets to be based upon demand and offers great flexibility in network operations. Furthermore, no gaps are left between packets and the small control overhead in each packet makes for very efficient capacity utilisation.

Synchronous packets 36 are further subdivided by the central controller 2 into 8-bit slots with each accommodating one direction of a voice circuit. The return direction for each voice circuit occupies a slot in the identical position on the other bus. This slotting of synchronous packets means that in the local area there is no delay associated with voice circuits apart from the normal transmission delay on the switch bus. Synchronous channels with bit rates higher than 64 kbps are obtained by dedicating more than one slot per frame. The multi-frame structure 32 is used to provide for low speed synchronous channels with a number of frames per multi-frame, N, depending on the minimum rate required, the rate being 64/N kbps.

The preferred format of ACF has eight bits of which the first two are used to provide frame synchronisation, the next three to indicate the signal packet type and the remaining three bits to provide control information for packet switching. Since circuit switching is mediated by the central controller, there is no overhead associated with source and destination address fields in synchronous packets 36. The trunks operate at a speed which is always a binary power multiple of 64 kbps with the overall speed chosen at the design stage according to the number of subsrcibers and facilities accommodated. The base rate used is preferably 16.384 Mbps with rates up to 500 Mbps and beyond being possible.

The data packet 38 shown in FIG. 6D has the ACF 40 in the first eight bits. Adjoining fields, which would typically be sixteen bits long, contain destination address DA and source address SA information respectively. Overall the structure is preferably in accord with the recommendations of the IEEE 802 Standard Committee.

The preferred form of ACF is shown in FIG. 7 is common to both the synchronous and data packets, as mentioned above. It comprises a frame SYNC subfield 42, BUSY subfield 44, TYPE subfield 46 and REQUEST subfield 48. The frame SYNC subfield 42 is determined by the central controller 2 and comprises two bits which are used to signal framing information. One possible coding is as follows:

1, 0 indicates first packet in a frame 30;
1, 1 indicates first packet in a multiframe 32; and
0, 1 indicates a packet other than the first in a frame.

The BUSY subfield consists of a single bit which is set when the packet is being used either for synchronous or data use. The TYPE subfield is three bits long allowing for eight packet type states to be signalled. One of these code words is used by the central controller to designate a packet as synchronous such as 1, 0, 0. When an AU detects this code word no attempt is made to decode the next field as a destination address DA. Non-synchronous packets initially have all zeros in the TYPE subfield and this allows the AU using the packet to signal the appropriate packet type. Examples of packet type are control packet, error recovery packet and normal data packet. The REQUEST subfield 48 is two bits long and provides two single bit common request flags (REQ) used by the distributed queueing protocol as will be described hereinafter. Of course each REQ flag may use more than one bit if desired.

The timing structure described above is most advantageous in that it is very flexible in its handling of synchronous and data packets and moreover lends itself to very significant reductions in hardware requirements because the same integrated AUs can be used for both synchronous and data packets and for transmissions at high and low bit rates.

In QPSX switching, priority which is under the control of the central controller 2 may be given to transmission of packets 36 for synchronous use and the remaining packets may be utilised for data transmission. The packet access protocol controls the access to the transmission subnetwork of data packets queued at each AU. The protocol functions by forming a single distributed queue of packets awaiting transmission at the AUs. It is also possible to establish levels of priority by running a number of simultaneous distributed queues, as will be explained hereinafter. FIG. 7 shows a two priority system having flags of different priorities, REQ1 and REQ2.

The distributed queueing protocol gives access to each packet in essentially the same order in time as it is generated. This is achieved with negligible overhead in network capacity and results in minimum access delay at all levels of network utilisation. In particular, distributed queueing does not suffer from the long access delays of other controlled access schemes at low network utilisation. As access however is deterministic this overcomes the problems that collision prone random access schemes incur at high network loading. Other features of the distributed queueing protocol are that its efficiency is independent of system bit rate, its control is distributed, and the logic required at each station is simple.

The first step in asynchronous data transmission is the packetisation of data into the data packets 38 illustrated in FIG. 6D. This is accomplished by routing software in the IP which puts the TYPE subfield headers, DA and SA in the packets. As the packets are formed at each station 16 they are queued by the transmitting AU in either the queue for bus A for transmission in one direction or bus B for transmission in the other direction depending on the destination address DA. As the access protocol for each bus is identical and independent it is only necessary to describe access for one of the buses, bus A.

The distributed queue protocol uses two bits of the ACF 40, namely the BUSY subfield 44 and the REQ bit of the REQUEST subfield 48 (for a single priority system) of each packet to govern the ordered access of packets to the buses A and B. The AU arranges for a BUSY bit to be fed forward on bus A which indicates that a packet is filled and the REQ bit fed backwards along bus B which indicates that a station downstream has a packet queued for transmission on bus A.

FIG. 8 shows the state diagram for the logic of an AU controlling access of packets from a station $S_i$ to the bus A. A similar state transition diagram would be applicable for access to the bus B. In an IDLE state 52, the AU has no packets queued for transmission on bus A. In this state however the AU must keep track of the distributed queue. It does this by means of a REQ bit counter 54 which is diagrammatically illustrated in FIG. 9. The counter 54 is incremented each time a REQ bit is read on bus B and decremented each time an unused packet passes the station $S_i$ on bus A.

Each REQ bit monitored by the AU represents a single packet queued for transmission on bus A at a downstream station. In this context it is important to note that a REQ bit may be sent only for the first packet in the queue at an AU and not for all packets queued. A new REQ bit may be sent each time a new packet moves into the first queued position at an AU. The REQ bit counter 54 is decremented each time an unused packet passes the station $S_i$ on bus A since such a packet will be used by one of the downstream stations queued for access. In this way the REQ bit counter is able to keep track of the number of stations following $S_i$ that have packets queued for transmission.

The AU at station $S_i$ will leave the IDLE state 52 as soon as a packet is queued for transmission on bus A AQ represents the number of packets queued for transmission at the AU. If the count in the REQ bit counter 54 is at that time not equal to zero i.e. if RC does not equal zero (where RC is the count of the REQ bit counter) then the current value of the counter is transferred to a countdown counter 56 and the REQ bit counter 54 is reset to zero. The AU is now in a COUNTDOWN state 58 shown in FIG. 8. Upon entering this state, the AU transmits a REQ bit in the ACF 40 of the next packet that passes on bus B. This will indicate to all stations that precede station $S_i$ along bus a that an additional packet is queued for transmission. There is a possibility however that this REQ may overwrite a REQ bit already sent by a station preceding station $S_i$ along bus B. Since station $S_i$ has its read tap 8 placed before its directional write coupler 12, it would have detected that the REQ bit had already been set before writing its own bit. The AU would then attempt to transmit the overwritten REQ bit in subsequent ACF's until it is written once without contention. This ensures that all packet requests are counted by the stations that precede it on bus A.

At the same time while in the COUNTDOWN state 58, the value of the count in the countdown counter 56 will be decremented for each empty packet that passes station $S_i$ on bus A. These packets will be used by stations downstream that had transmitted REQ bits before station $S_i$ had gone into the COUNTDOWN state. The existence of the COUNTDOWN state ensures that station $S_i$ does not access bus A before those stations downstream that were already queued.

While in the COUNTDOWN state 58 it is still necessary for the REQ counter 54 to keep counting the REQ bits received on bus B since these represent new packets being queued. The REQ counter 54 will only be incremented in the COUNTDOWN state 58 since the empty packets passing on line A are used to decrement the countdown counter 56.

When the count of the countdown counter 56 equals zero (CD=0, where CD is the count in the countdown counter) the AU goes into a WAIT state 60. It then waits for the next free packet on bus A to transmit its data packet as shown in FIG. 10. When a packet becomes available, it will enter an ACCESS state 62 in which the AU will transmit the first packet in its queue for bus A in the next packet on that bus which will be free. On completion of transmission, the AU checks to see if there are any remaining packets queued for bus A. If there are none, the AU returns to the IDLE state 52; if there are some it goes to either the COUNTDOWN state 58 if RC does not equal zero or to a STANDBY state 64 if RC equals zero.

As can be seen from FIG. 8, the STANDBY state 64 is only entered from the IDLE or ACCESS states: it is entered when a new data packet has moved into the first queue position at the AU and the REQ bit count is zero. This implies that there are no stations following station $S_i$ on bus A that have packets queued for transmission. This state would therefore only be entered during a period of low network utilisation. The STANDBY state exists so that the AU can decide whether or not it is necessary to send a REQ bit. In this state the AU will simultaneously read and write a BUSY bit into the BUSY bit subfield 44 of the first packet encountered on line A. If the BUSY bit is not set the AU goes directly into the ACCESS state 62 and transmits in the next packet without sending a REQ bit. This allows more direct access to the bus during periods of low network utilisation. If on the other hand that first packet had been BUSY, the AU would attempt to transmit a REQ bit on line B in the same manner as described previously. The AU would also go directly to the WAIT state and access the network when the next free packet arrives. This sequence is diagrammatically illustrated in the flow chart of FIG. 10.

The use of the STANDBY state in access by distributed queueing is optional. If it is not used then the input conditions that lead to the STANDBY state would be transferred to the COUNTDOWN state. That is, in this case whenever a new packet moves into the first queue position in the AU, the AU will go to the COUNTDOWN state.

For a station waiting to transmit a packet on bus A, the operation of the distributed queue is affected by the arrival of busy packets coming from upstream stations with prior right of access that is to say those which have queued first, and by the count in the countdown counter 56, which indicates the number of downstream stations with prior right of access. The REQ bit marks the time that a particular packet is queued at an AU for transmission and as such determines that packer's position in the distributed queue.

If there were no delay in transferring the REQ bits on the network, the operation of the distributed queueing protocol would be perfect. As it is, the only effect of this delay is to cause a slight bias in the ordering of access in favour of upstream stations. There is no reduction in efficiency.

As mentioned previously, separate distributed queues are established for access to the bus B.

A straight forward extension of the distributed queue protocol permits the assignment of priority to packets such that queued packets with a higher priority gain access before lower priority packets. This is achieved simply by operating separate distributed queues for each level of priority. Each is coupled in the same sense that packets queued for a particular priority level may gain access only when the high priority queues are empty.

The implementational changes necessary to operate with a multi-level priority structure are minimal. For an N-level system N separate request channels must be provided in the ACF and each AU must operate in separate countdown counters 56.. In the arrangement illustrated in FIG. 7, the request subfield 48 there are two REQ bits denoted REQ1 and REQ2, appropriate for a two-level priority system (i.e. N=2). For an AU to transmit an I-level packet on line A, the following procedure is used: when the packet reaches the head of the I-level packet buffer at the AU, a request is transmitted on the I-level REQ channel on line B. This request is registered by all AUs on line A ahead of the requesting stations. Such registration involves incrementing all request counters 54 of priority I and below. As before, each request counter of an AU is decremented for each empty packet passing on line A. The packet at the head of I-level buffer does not cause the AU to enter the COUNTDOWN state 58 until it has transmitted all of its higher priority buffered packets. Even when in the I-level COUNTDOWN state 58, any new requests at priority levels higher than I will increment the countdown counter 56. Accordingly, the packet at level I will not access the network while there are higher priority packets queued at any AU. Requests at level I, while the AU is in the I-level COUNTDOWN state, will increment the I-level REQ counter. Lower level requests only affect the lower level REQ counters.

Except for the need to increment the countdown counter 56 when higher priority requests are received each distributed queue functions normally. During periods of high network utilization, the access of packets of all priorities is ordered with the packets of lower priority filling the gaps not taken by higher priority packets. At low network utilisation packets will as before gain near immediate access.

Where a network operates with a two-level priority structure with high priority access demanded infrequently it is not necessary to operate the higher priority distributed queue. Two REQ channels however are normally required and the provision still must be made for high priority requests to increment the countdown counters 56. Immediate access is gained by a high priority packet, independent of the length of the low priority queues, since a high priority request serves to hold off for one free packet, low priority access. This process can be described as queue jumping and might for instance be utilised for signalling fault conditions. The queue jumping technique can of course be extended to systems with multi-level priorities.

The logic required for carrying out the distributed queue protocol is within the AUs. It would be possible to arrange for the AUs to include a microcomputer in order to carry out the logic with appropriate software programs. This would however be relatively slow in operation and accordingly it is preferred that the AUs include specific hardware to carry out the logical functions. Of course an AU or a cluster of AUs could be integrated as a single VLSI chip. In the description which follows and outline for the circuitry of an AU is given using standard integrated circuits (IC's).

FIG. 11 shows in schematic form the architecture for an AU 4. The AU comprises a packet switch 66 which controls the access and receipt of asynchronous packets 38 from the buses A and B. The AU also includes a TDM switch 68 which controls access and receipt of synchronous packets 36 from the buses A and B. In the illustrated arrangement, a switch controller 70 is shown for controlling the switches 66 and 68 but it is optional. If it were provided, it would mediate operation of both the switches or could be used to monitor packets through the other switches. Normally an AU has both of the switches 66 and 68 but since these are functionally independent, some AUs may have only one or other of the switches depending upon their intended use. The TDM switch 68 however uses some functions of the packet switches for signalling during circuit set up and tear down. Therefore each TDM switch 68 requires a packet switch but a single packet switch could be shared by a large number of AUs in a cluster having only the TDM switches 68. Similarly, if the switch controller 70 is provided, it can be used in conjunction of a large number of AUs in a cluster.

As shown in FIG. 11, the bus connections 6, 8, 10 and 12 for the packet switch 66 and TDM switch 68 are shared. This is possible because the packet and synchronous communications never overlap as described previously. There is never any contention in the distributed queue protocol except on the BUSY and REQ channels but this is resolved by using OR gates for writing to the buses, as shown in FIG. 2.

FIG. 12 shows a schematic block diagram for the packet switch 66. The components to the left of chain line 72 being essentially the receive logic and the components to the right of the chain line 72 being essentially transmit logic. The diagram shows control buses 74 and 76 to and from the IP 16 connected to the AU. The circuitry above the control buses 74 and 76 is associated with reading and writing on bus A whereas the circuitry beneath the control buses 74 and 76 is in relation to bus B. The circuitry for the two buses A and B is the same and therefore only that associated with bus A will be described in detail.

The receive side of the AU bus A includes a series to parallel shift register 78 coupled by the read tap 6 to bus A. All data passing on the bus A is shifted into the register 78 to produce as output an 8 bit wide parallel data stream which is connected to the input of a small buffer 80 and a receive logic circuit 90. This conversion to parallel data stream which is connected to ACF and DA decoding to be performed at the slower 2 MHz by byte, rate. The small buffer 80 provides time for the initial decoding of the ACF and DA to be carried in the receive logic circuit 90. The output of the small buffer 80 is allowed to input to a larger receive buffer 82 if the receive logic circuit 90 decodes that the packet contains data intended for the station. Data, in packets, stored in the buffer 82 is transmitted to the IP on line 84 subject to control signals from the IP on line 76 to a buffer control circuit 86. The buffer control circuit 86 enables the sending out of data from the buffer 82 onto the lines 84 subject to control signals on line 76 from the IP. The buffer control circuit 86 also controls the reading in of data to buffer 82 when a valid packet indicated by a PV signal is detected by the receive logic circuit 90. The remaining function of buffer control circuit is to keep a count of the number of packets stored in the buffer 2.

The receive side of the AU includes a frame sync circuit 88 which has input from tap 6 and also the bit rate clock from bus A via line 20. The circuit 88 generates all timing signals for the logic on bus A from the serial bit stream on bus A. At start up, the frame sync circuit 88 enters a search mode to find the frame sync pattern indicated by the first bits in the ACF of every packet. Synchronisation is assumed when for four consecutive frames, the correct sync pattern is read. Once obtained, synchronisation will not be regarded as lost until the sync pattern is incorrect over two consecutive frames. This technique for frame synchronisation is well known per se. The frame sync circuit 88 could be shared by a number of AUs in a cluster.

The receive logic circuit 90 has input to a 21 timing signals from the frame sync circuit 88 that indicate when the ACF and DA are stored in the small buffer 80. The receive logic 90 also has input from the small buffer 80 and thus its primary function is to interpret the ACF and DA fields of each packet. A packet valid output PV will be set by this circuit 90 for busy packets addressed to the station. When the PV output is set, the data packet is passed through the buffer 80 to be stored in the receive buffer 82. The receive logic circuit 90, since it decodes the ACF, will extract the count bits for the distributed queue protocol REQ and BUSY, therein as separate signals. The REQ bit is passed on line 92 to the distributed queue logic for bus B. The BUSY bit is passed on line 93 to a distributed queue logic circuit 106 on bus A to indicate the passing of empty packets. The data stored in the receive buffer 82 is read by the IP 16 during appropriately timed read. Cycles which are generated by the buffer control circuit 86 under the control of the IP via line 76.

The operation of the receive logic for the bus B is essentially the same with data being read via tap 8. REQ signals detected by the receive logic circuit 94 will be outputted on line 76 for subsequent input into the distributed queue logic for bus A.

On the transmit side of the packet switch 66, data packets from the IP that are queued waiting for access to bus A are stored in a transmit buffer 98. The data packets are transferred to the buffer 98 from the IP via line 100. The control bus 74 from the IP has on it control signals which are input to a buffer control circuit 102 to indicate when a packet is being transferred and to which transmit buffer (i.e. for bus A or bus B) it is to be stored. To steer the packets to the correct bus the IP examines the destination address, DA, of each packet and determines whether that address is to be reached along bus A or bus B this being performed in the IP by known software techniques. The output of the buffer 98 is connected as input to a P/S register 194. The data will be transferred from the buffer 98 at the time that the packet is allowed to be transmitted on bus A. This time is determined by the distributal queue logic circuit ]06 and the buffer control circuit 102. The register 104 converts to parallel output of the buffer 98 to serial data on line 10 which is coupled onto bus A via the OR gate 24. The OR gate 24 has inputs from the delay 18 which is the data already on bus A, serial packet data from the AU on line 10. One busy control which is generated by a control bit writing circuit 110 which is used to set this control bit when the AU writes a packet, and the REQ bit input which is generated by the control bit writing circuit on bus B. This REQ bit input represents the writing of a REQ on the reverse bus when a packet comes queued for transmission.

This buffer control circuit 102 performs three functions. One is to control the storage of data from the IP on line 100 in the buffer 98. Here the buffer control circuit generates a signal to write the data into the buffer 98 subject to control from the IP on line 74. Another function of the buffer control 102 is to read data from the buffer 98 for transfer to register 104 and eventual transmission. In this case the buffer control circuit produces 32 pulses to read all the bytes of a packet from the buffer 98 during the time that the packet is allowed to be transmitted. This part of the buffer control 102 is subject to control by the distributed queue logic circuit 106 which determines according to the distributed queueing protocol when the stored packet may be transmitted. The remaining function of buffer control circuit 102 is to generate a packet queued, P2, signal which indicates to the distributed queue logic circuit 106 when a complete packet is stored in the buffer 98.

The distributed queue logic circuit 106 implements the distributed queueing protocol in the AU. It has a clock input from the frame sync circuit 88. The BUSY bit read on bus A by receive logic circuit 90 and REQ bit read on bus B by receive logic circuit 94 are also input distributed logic 106. Each REQ bit in the ACFs on bus B causes the REQ count in counter 54 to increment. The BUSY is used to determine when empty packets pass on bus A. For each empty packet the REQ count is decremented in the IDLE state and the countdown count in the count down counter 56 is decremented in the COUNTDOWN state. The remaining input to the distributed queue logic circuit 106 is the PQ signal which is set while a packet is stored in the buffer 98. The PQ signal causes the logic circuit 106 to go to the COUNTDOWN or STANDBY state and attempt access. The output of the logic circuit 106 is a WAIT state indicator which is used by buffer control circuit 102 together with the BUSY bit to determine when to access. Another output from the logic circuit 106 is connected to the bit writing circuit 110. When an AU enters the COUNTDOWN state 58 initiated by the PQ signal, the control bit writing circuit 110 will generate a REQ signal which is input to bus B via OR gate 24. This writing circuit 110 ensures that the REQ is written without contention. That is, if it overwrites an already set REQ it is rewritten in the next ACF. The control bit writing circuit 110 also inputs the BUSY bit to bus A via OR gate 24 when the AU is the WAIT state awaiting transmission of a packet.

The transmit logic for the bus B is the same as that for bus A and therefore its operation need not be described.

FIG. 13 shows in more detail part of the transmit logic for bus A which is shown in FIG. 12. It will be seen from this figure that the transmit buffer 98 comprises a FIFO of serial number MK 4501N12. The buffer control 102 includes a FIFO management circuit 112, storage logic circuit 114 and transmit logic circuit 116. The FIFO management circuit 112 produces at one of its outputs the PQ signal to indicate when a complete packet is stored in the buffer for transmission, the PQ signal remaining high while there is a complete packet in the buffer 98. The circuit 112 also produces a ready signal RDY which passes to the IP via control bus 74 so as to indicate that transfer to the buffer 98 may proceed. The PQ signal cannot be derived directly from the EF flag from the buffer 98 indicating that it has no bytes therein because the EF signal goes high as soon as the first byte of a packet is stored in the buffer.

The transmit function cannot proceed until a full packet is stored in the buffer 98. It is the function of the FIFO management circuit 112 to indicate when a full packet 4 stored in the FIFO. FIG. 14 illustrates a simple circuit realisation for the FIFO management circuit 112. The essential part of the circuit is an UP/down counter 122. This counter 122 records the exact number of full packets in the FIFO. An OP gate 126 at the counter output used the count to produce the packet queued, PQ, signal. If the count is zero, PQ=0, indicating no packets queued. If the count is any value greater than zero the PQ output will be one, indicating at least one packet is queued. The value in the count is altered by two inputs. One is the packet transmitted, PTX, signal which is generated by the transmit logic 116. This signal is pulsed each time a packet is sent on bus A. Whenever PTX is pulsed the counter 122 is decremented. The other signal is the packet end, PEND, signal which is sent by the IP to denote the end of a single packet transfer. Each time this signal is set the counter 122 is incremented.

The counter 122 is clocked at the byte rate which is the bit clock rate divided by 8. Hence for correct operation of the counter the two inputs, PTX and PEND, must be synchronous with the byte clock. That is, it must be high for only one clock period, in particular, at only one rising edge of the clock. The PTX is already synchronous so may be input directly to the counter 122. The PEND from the IP will in general not be synchronous with the byte rate clock. The PEND signal is synchronised by the use of D-type flip flops 118 and 120. The flip flop 118 has S and Q inputs permanently high. The PEND inputs at the clock input of flip flop 118. When PEND is set the Q output of the flip flop 118 is set. The Q output of flip flop 118 connects as the Q input of flip flop 120. Flip flop 120 is synchronised, that is clocked at the byte rate so the Q output of flip flop 120 is a synchronised PEND pulse. The Q output of flip flop 120 is fedback to the reset, $\overline{R}$, input of flip flop 118 to clear its Q output so as to prevent further synchronised PEND pulses being produced until the PEND from the IP is again sent.

The synchronised PEND and PTX are input to an exclusive OP gate 124 to enable the counter 122 to count. The UP/Down control input of the counter 122 comes from the Q output of flip flop 120 and controls the direction of count.

The RDY signal, i.e. FIFO ready, is another signal output from the circuit 112 and it indicates to the IP that the FIFO CaD receive packets. The RDY signal may be derived directly from the e,uns/FF/ , is FIFO full flag, output of the buffer 98.

The principal function of the storage logic 114 is to produce a $\overline{W}$ signal to the buffer 98 so as to correctly synchronise writing of data from the IP into the buffer 98. The storage logic 114 has a clock input STROBE and an enable signals from the IP. The storage logic circuit 114 therefore need only comprise an AND gate (not shown) to gate the STROBE and EN signals from the IP. FIG. 15 illustrates a typical waveform 128 for the STROBE signal from the IP and the waveform 130 shows a window in which valid data can be read into the buffer 98.

The primary function of the transmit logic 116 is to produce signals which are applied to the read $\overline{R}$ input to the buffer 98 so as to read data from the buffer 98 to the parallel to serial register 104 when appropriate. This is done when a low signal is applied to the $\overline{R}$ input.

FIG. 16 shows a typical input waveform 132 applied to the R input of the buffer 98. It comprises a square waveform, the low periods of which are 250 nsec. Because of the characteristics of the buffer outputs, a delay of about 120 ns occurs before valid output data can be read thus valid data is set up for about 130 nsec before the rising edges of the clock and held for about 5 nsec after the rising edge.

The IP in forming its packet preshift its ACF byte by three bits. This is necessary because it takes three bit times in the ACF before the AD can determine its right to access the bus. Such preshifting ensures the bits in the TYPE subfield are written in the correct places.

The transmit logic 116 also generates a packet empty signal PE which is inputted to the register 104. The PE signal is normally high and will go low only when an empty packet is detected in the WAIT state 60 and in the last bit position of each successive byte of the packet being read out of the buffer 98. FIG. 17 shows a simple circuit for generating the PE signal. It comprises a NAND gate 136 which generates the MT signal indicative of an empty packet on line A when the AU is in the WAIT state waiting for access. The inputs to NAND gate 136 are thus bit 2, which is pulses when the BUSY bit is passing on bus A, the inverted input from the line A via the read tap 6 and the WAIT state signal. The MT signal is connected to the S input of an SR flip flop 138, the R input of which is reset by the last byte, i.e. byte 31 of the packet to be transferred. The Q output of the flip flop 38 indicates the ACCESS state 62 and it is connected to one input of a NAND gate 140. The other input to the gate 140 is bit 7, the last bit of each byte to ensure the register 104 is loaded with the next byte at the end of the preceding byte. The output of the gate 140 is connected to the input of an AND gate 142 the other input of which is the MT signal from the gate 136. Output of the gate 142 is the PE signal. It follows that the output of NAND gate 140 is asserted when the MT signal is asserted at the start of a packet transmission and then 31 times during bit 7, the last bit of each byte, until the end of the packet. This applies for all bytes in the packet except for the last and only if a packet is being transmitted.

The transmit logic circuit 116 also produces read signals R signals which are applied to the R input of the buffer 98. The R signal must go low as soon as the WAIT signal is generated by the distributed queue logic 106. This ensures that data is accessed even if the WAIT signal goes high at the start of the first byte of an empty packet. The R signal must produce a sequence of low pulses in order to read the data from the buffer 98 into the register 104. The first low pulse in the R signal stays low until an empty packet is found. The R signal must then return high at the beginning of the fourth bit period. It then goes low over bits 5, 6, 7 and 8 to read the second byte. Thirty-one of such pulses must be produced during bytes 1-31 (but not for byte 32). The TX output on the Q output of flip flop 138 can be used in conjunction with the bit values of the second half of the byte. FIG. 18 illustrates this technique for generating the required R pulses. The circuit includes a three input NAND gate 144 which has its inputs connected to the TX signal, WAIT signal and bit 0 time of each byte that passes on bus A. The circuit also includes a two input NAND gate 146 one input of which is the TX signal and the time that bit 3 of each packet passes on bus A. Output from the gates 144 and 146 are connected to the S and R inputs of a flip flop 148. The circuit further includes a two input NAND gate 150 which again has one input from the TX signal together with the bit times bits 4, 5, 6, and 7 in each byte. The Q output of the flip flop 148 is one input of an AND gate 152, the other input of which is connected to the output of gate 150. The output of the gate 152 is the required R signal. The part of the signal which passes through the flip flop 148 produces the first low pulse for transmitting the first byte whereas the output of the gate 150 produces thirty-one successive pulses for the remaining bytes of the packet.

The transmit logic 116 also produces the PTX signal for packet transmit synchronisation. The PTX signal is a synchronous signal which is set at the rising edge of the second byte of the packet being written into the register 104 from the buffer 98. It can simply be formed at the output of an AND gate (not shown) having its inputs connected to the TX signal and byte 0.

FIG. 19 shows one circuit for implementing the distributed queue logic circuit 106. As mentioned previously, the circuit 106 includes the REQ counter 54 and countdown counter 56. Generally speaking, the REQ bit counter for transmissions on bus A keeps track of the number of REQ bits received by the access unit on bus B. It increments the count for each REQ bit received on bus B and for each empty packet that passes on bus A, while the access unit is in the IDLE state 52. Control for the counter 54 is by an enable input CET and a U/D input. When CET is low, the counter 54 is able to count the next clock edge. It counts up if U/D is high or down if U/D is low. The parallel enable input, PE, is used to clear the count after it has transferred its count to the countdown counter 56 which occurs when the access unit has a packet for transmission that is to say when the PQ signal first goes high.

The countdown counter 56 is loaded from the counter 54 as mentioned previously. This counter always counts down but is only able to decrement by a low on its CET input when an empty packet passes on bus A and the AU has a packet for transmission. The MT signal input from logic circuit 90 is used to indicate when an empty packet passes. It follows of course that all input signals to the counters must be synchronised with the 2 MHz clock signal on line 156 to the counters. The 2 MHz clock is obtained by dividing the clock signals on the bus by 8. The circuit includes a D-type flip flop 158 the D input of which is connected to an array of NAND gates 157. The S output of this flip flop indicates the IDLE state 52 i.e. when the S output is low the AUs in the IDLE state. At all other states the output is high.

The array 157 decodes various inputs thereto to determine the function of the counters and the state of the flip flop 158. The external inputs to the array 157 are:
 (a) the PQ signal from the transmit logic 116 and
 (b) the REQ signal from the control bit reading circuit 108. Other inputs to the array 157 are internally generated in the circuit 106 and are set as follows:

RCZ=1, while REQ counter 54=0;
CDZ=1, while countdown counter 56=0; and
RCOF=1, REQ counter 54 overflow set when REQ counter is maximum.

The external inputs are also set as follows:
REQ=1 for one byte per word for each REQ bit received;
MT=1, for each empty packet that passes on bus A,
PQ=1, while a full packet exists.

The outputs are set as follows:

RCU=1, Increment REQ counter 54;
RCE=1, REQ counter 54 enable;
DCD=1, decrement countdown counter 56;
PL=1, parallel load countdown counter 56;
MR=1, master reset synchronously REQ counter 54; and
WAIT=1 WAIT state 60 indicator It will be noted that some outputs from the counters 54 and 56 are fed back to the gate array 157. In particular, the RCZ signal indicates that the REQ counter 54 is equal to zero. This input is used to prevent further decrementing of the REQ counter 54 when empty packets pass on bus A. The RCOF signal denotes an overflow of the counter 54 when the counter reaches its maximum value and prevents further incrementing to overflow. The CDZ signal together with the S output of flip flop 158 being set indicates that the WAIT state. This indicates that all REQ signals have been counted out and hence if a packet is waiting for access, it can be transmitted to the next free packet. In other words the CDZ signal indicates the ACCESS state 62.

The function of the array 157 is to control the operation of the REQ counter 54, COUNTDOWN counter 56 and flip flop 158 so as to implement the distributed queueing algorithm. The outputs this array generates are generally all used for internal control of the logic and only one output is used externally which is the WAIT state signal indicator. The RCU output of the array is used to control whether the REQ counter counts up or down and is input to the Up/Down input of the REQ counter 54. This input is derived directly from the REQ bit input. If REQ is set line counter goes up, if not counter decrements. Both providing the counter is enabled by a REQ counter enable signal, RCE. The REQ count will be enabled when a REQ is received, an empty packet is received during the IDLE state but not if both occur. If both occur simultaneously the count is not altered. The counter 54 will also not be enabled to count beyond its maximum or minimum values. A DCD signal when set causes the COUNTDOWN counter 56 to decrement by one. This signal is only set when in the COUNTDOWN state, an empty packet passes, and the count is not already zero. The parallel load countdown counter, PL, and the Master reset if REQ counter, MR, each occur at the same time that is when a new packet moves into the first queue position in the AU. The MR clears the REQ count from counter 54 and PL loads the count to the COUNTDOWN counter 56. These signals can only be asserted when the AU is in the IDLE state and the PQ signal is set i.e. the REQ is loaded when PQ is asserted in the IDLE state. The WAIT state indicator is asserted in the COUNTDOWN state when the count of counter 56 is zero.

FIG. 19 also shows the inputs to the control bit writing circuit 110 in order to generate the REQ signal for bus B when the AU has a packet stored for transmission on bus A.

FIGS. 20A and B show a circuit realisation for the distributed queue logic 106 using standard integrated circuits. This circuit need not be described in detail. However ICs 160 and 162 are used to realise the counter 54, and the IC 168 is the flip flop 158. The IC 170 is used as an input latch for the MT signals from bus A and REQ signals from bus B. The remaining IC's are used for implementation of the gate array 157. The circuit FIGS. 20 shows a trigger circuit 172 for generating reset pulses for correct initialisation of the components.

FIGS. 21A and B illustrate a circuit realisation using standard ICs except for the remainder of the transmit side of the AU for bus A. This circuit realisation need not be described in detail.

FIG. 22 illustrates in more detail part of the receive logic of the AU for reading data from bus A. As mentioned previously, the receive logic is duplicated for receiving data from bus B. It will be seen that the buffer 80 comprises four latches 174, 176, 178 and 180 serially connected as shown. During the first byte of each packet on bus A, the first byte on the packet is loaded onto the register 78. During the second byte, the first byte is transferred to the latch 174 and the receive logic circuit 90 decodes the content of the latch in order to check the content of the TYPE subfield 46 and the BUSY subfield 44. During the third byte, the second byte of the packet which includes the destination address DA, which is two bytes long, as shown in FIG. 6D, is loaded into the latch 174 and the high (first) byte of the address is compared by the receive logic circuit 90 in order to see whether the packet is destined for that AU. During the fourth byte, the third byte of the packet is loaded into latch 174 and the low (second) byte of the DA is compared. Generally speaking, if all conditions are satisfied, a packet valid PV signal is generated by the logic circuit 90. The PV signal is then passed to the buffer control circuit 86 to cause loading of the full 32 bytes of the packet into the receive buffer 82. It will be seen that the buffer 80 provides temporary storage of the first three fields of the packet so as to provide time for the functioning of the receive logic 90 and buffer control 86.

During second byte, the destination address DA of the packet is held in the first latch 174 and it is inputted to the A-input of a comparator 182. The B-input of the comparator is coupled to a pair of three-state latches 184 and 186 which have address information inputted thereto from the IP coupled to the AU. If the address matches, the E output of the comparator 182 will go high. The output of the comparator 182 is connected to the D input of a D-type flip flop 188 the Q output of which is connected to a NAND gate 190. The other inputs to the NAND gate 198 are from the comparator 182 and the address input line to the latch 186. The configuration is such that an address valid signal AV appears at the output of gate 198 during the fourth byte if there has been a correct match of the addresses by the comparator 182.

The logic circuit 90 includes an ACF decode circuit 200 which effectively decodes the BUSY and TYPE subfields 44 and 46. The circuit 200 comprises a three input NAND gate 202 which is responsive to 1, 0, 0 in the TYPE subfield 46 which is detected so as to exclude receipt of synchronous packets. Output from the gate 202 is gated with the BUSY bit to produce a busy data packet BDP signal which is indicative of a busy data packet received on the read tap 6. The BDP signal from the decode circuit 200 is gated with the output of gate 198 to produce a packet valid PV signal which is inputted to the storage control circuit 86. The storage control circuit is arranged to correctly synchronise the transfer of data from the latch 180 to the receive buffer 82.

The storage control circuit includes a counter circuit 206 for counting the number of packets stored in the buffer 82 so as to prevent any attempt to store a new packet in the buffer if it is full, even if the sixteenth packet is being read out at that time. FIG. 23 shows a suitable counter circuit comprising an updown counter 208 which counts PV pulses during the fourth byte of the received packet. The counter is decremented when a complete packet is read from the R terminal of the buffer to the IP. The decrement signal may be derived from a counter which counts R pulses or by an explicit signal for that purpose from the IP. The counter 208 receives PEND signals from the IP correctly synchronised by the use of a pair of flip flops 210 and 212. Any output in the counter 208 indicates that a packet is stored in the buffer 82 and will be indicated by the output of OR gate 214. The output of AND gate 216 indicates that the buffer is full. Output from the gate 216 can be used to disable the W input to the buffer to prevent any attempt to load any further packets therein.

The REQ signal which is outputted on line 92 for use by the transmit logic associated with bus B is derived from the receive logic block 90 on bus A. In particular, during the second byte the ACF is latched on the latch 174 of the small buffer 80. In the seventh bit position of the eight bits is the REQ bit. The REQ bit for line 92 is taken directly from here only during the second byte and a transferred therefore to the distributed queue logic associated with bus B.

FIGS. 24A and B show a circuit realisation for the receive logic associated with bus A using standard integrated circuits. It need not be described in detail. The circuitry would be duplicated for the receive logic associated with bus B.

FIG. 25 shows a schematic diagram for the TDM switch 68. Generally speaking, the TDM switch is a slot selector wherein slot addresses are given to the TDM switch which will then read these slots serially at a predetermined rate which will normally be say 16 Mbps. The TDM switch does not need any buffer storage. Other significant functions of the TDM switch are serial to parallel conversion and speed conversion if required. The arrangement illustrated schematically in FIG. 25 shows the components required for receiving and transmission of data to and from bus A. These components would need to be duplicated for bus B, as in the case of the packet switch 66.

The arrangement includes a frame SYNC circuit 218 which receives clock pulses from bus A. The frame SYNC circuit can be the same as the frame SYNC circuit 88 of the packet switch 66. Data from bus A is read on tap 6 into a serial to parallel register 220 and then to a bus 222 to the IF 17, under the control of a slot detection logic circuit 224 which receives synchronising signals from the frame SYNC circuit 218. The transmission side is analogous in that it includes slot detection logic circuit 226 which receives timing signals from the frame SYNC circuit 218. The circuit 226 controls a parallel to serial register 228 which receives data from bus 230 from the IF. Output from the register 228 is coupled to the bus A by write coupler 10. Again, these components are duplicated for communications to and from bus B. The slot detection circuit 224 (and 226) is simply a time slot allocating circuit and may comprise a standard IC known as a TSAC circuit which are supplied by a number of manufacturers including MOTOROLA. The commercially available TSAC circuits operate at only about 2 MHZ and if higher speeds were required, faster circuits using similar techniques could be fabricated. Further, the TSAC circuit operates at a fixed rate of 64 kbps and it would therefore be preferred to utilize a similar circuit but of selectable speed of operation.

FIG. 26 shows in block diagram form the principal functions of the central processor 2. The arrangement includes a timing generator 240 which generates the master network clock for the buses A and B. If the QPSX network is coupled to a public telephone system, its clock would be in synchronism with an appropriate multiple of clock of the PCM systems of the telephone network. The clock transmission from the timing generator 240 can be transmitted on the buses A and B by using an appropriate line code or through a separate multiplexed channel on the network trunks. The arrangement includes an empty packet generator 50 which feeds both buses A and B with packets carrying the appropriate sync timing information in their respective ACF fields. Where such packets are not reserved for synchronous use nor are used by the central controller 2 for signalling or control, all bits within the packets other than the bits of the frame SYNC subfield 42 of the ACF would be set to zero. In the arrangement illustrated in FIG. 26, the network controller 2 is shown as having access units 242 and 244 on either side of the empty packet generator. These AUs are required by the controller for signalling in relation to the setting up and tearing down of synchronous circuits. This signalling is accomplished on the network using high priority packets having appropriate priority bits e.g. REQ1 inputted by the controller to the REQUEST subfield 48 of the packets put onto the lines by these AUs. Thus, the controller does not need to operate within the distributed queue because all of its packets put on the buses A and B will normally have high priority classification.

The network controller 2 may provide optional features which are carried out by software in a central processor memory 246. For instance, the central processor may operate a working table of active telephone calls in the network with entries logging the current state, time out, slot occupied and address. Another possibility would be to list the AUs serving particular telephones and here a flag could be used to signify whether a telephone is in use and if so provide a pointer to the relevant entry in the working table. A similar table of all AUs could be kept with pointers to the table of AUs serving telephones. Further, to ensure portability of a particular telephone number an AU to telephone number translation directory could also be kept.

The empty packet generator 50 produces timing signals for generation of empty packets for the buses A and B with correctly encoded subfields in their ACFs and in particular, the bits of the FRAME SYNC subfield 42. The generator 50 can operate unsupervised but an eight bit parallel connection can allow for an external computer to control the assignment of packets.

One circuit realisation for the generator 50 using standard ICs is illustrated in FIG. 27. The basis of timing used by the generator 50 is a 32.768 MHz crystal oscillator 248 the output of which is buffered by an inverter which drives a counter chain comprising counters 250, 252, 254 and 256. All the counters are modulo-16 counters except for the counter 256 which is a modulo-10. The circuit includes a data ROM 264 which is used to hold data required to produce the empty labeled packets while a second ROM 264 is used as control for the ROM 264. Both ROMs 264 and 266 are addressed directly by the outputs from the counter chain with a new address appearing every 500 ns. The circuit includes latches 268 and 270 which receive data from the ROMs 264 and 266. The TC output from the first counter 250 occurs approximately 30 ns before each new address is generated and is used to effectively latch the ROM outputs before they begin to change.

The thirty-two bits counted by the serial connection of the counters 250 and 252 define the number of bits in each packet. The counter 254 defines the number of packets in each frame and accordingly a beginning of frame signal BOF is produced at its final stage. The counter 256 is used to count the frames in a multi-frame if established.

The circuit includes a parallel to serial shift register 274 which is used to input the data, which comprising the FRAME SYNC subfield 42, onto the data buses A and B from the latches 268 and 270. The S/P-input of the register 274 is generated by a D-type flip flop 376 which in turn receives the delayed and inverted TC output signal from the counter 250.

Since only 256 bytes of data are necessary to generate a complete frame, the data ROM 264 may be arranged to contain eight possible frames. For instance, the available frames contain one to seven synchronous packets with the remainder in each case being devoted to data. A further latch 378 is provided to connect three high order address bits from the data and control ROMs 264 and 266 to select the various frames. The bits are latched from the controlling CPU 246 of the central controller 2 at the start of each frame. A signal is returned to the CPU to allow it to write the outputs at the appropriate time and avoid selection of an incorrect frame format. Interrupts on the CPU should be disabled during checking and writing of this information to prevent errors. A simple reset circuit 380 is provided to reset the counters and shift registers on power up or reset via the controlling CPU.

Many modifications will be apparent to those skilled in the art without departing from the spirit and scope of the invention. For instance, the implementation of the queueing protocol could be allowed and achieve the same result. Instead of resetting the request flag counter 54 on entering the countdown state the count therein could remain unchanged but, thereafter, both the request flag counter and the countdown counter 56 are decremented each time an empty data packet passes on the bus which has packets queued for access.

We claim:

1. A method of queuing data packets for transmission from access units in a network having first and second oppositely directed buses with a plurality of access units coupled between the buses, said method including the steps, when an access unit has a data packet for transmission, of:
    (a) determining on which one of the buses the data packet is to be transmitted,
    (b) transmitting a request flag on the other of the buses, and
    (c) selecting an empty or available data packet on said one bus for transmission of the data packet from the access unit with reference to the number of empty or available packets received at the access unit on said one bus and the number of request flags received at the access unit on said other bus.

2. A method as claimed in claim 1 including the step of storing a value which is related to said numbers.

3. A method as claimed in claim 2 wherein the value is related to the difference between said numbers.

4. A method as claimed in claim 3 wherein the value is stored as the count of a request flag counter which is incremented in response to received request flags at the access unit on said other bus and decremented in response to received empty or available data packets at the access unit on said one bus.

5. A method as claimed in claim 4 wherein the step of selecting an empty or available data packet includes an assessment of the magnitude of the count of said request flag counter when the access unit receives a data packet for transmission.

6. A method as claimed in claim 5 wherein the step of selecting an empty or available data packet includes causing a delay between the time when an access unit receives a data packet for transmission and the time of transmission thereof on said one line, said delay being related to the magnitude of said count of said request flag counter.

7. A method as claimed in claim 6 wherein, when the access unit receives a data packet for transmission, the count of said request flag counter is transferred to a countdown counter and the count of the countdown counter is decremented in response to receipt at the access unit of empty or available data packets and wherein the data packet is transmitted on said one line when the count of the countdown counter reaches a predetermined value.

8. A method as claimed in claim 7 wherein the count of the request flag counter is reset to a predetermined value after its count has been transferred to the countdown counter.

9. A method as claimed in claim 8 wherein both said predetermined values are zero.

10. A method as claimed in claim 9 wherein, after the resetting of the request flag counter and before transmission of the data packet from the access unit, the request flag counter is incremented in response to request flags received at the access unit on the other line and is not decremented in response to empty or available data packets received at the access unit on said one line.

11. A method as claimed in claim 8 including the step of storing a second value which is related to the number of empty or available data packets received at the access unit on said other line and the number of request flags received on said one line, whereby a separate distributed queue is established for transmission of data packets on said other line.

12. A method as claimed in claim 1 wherein said data packets include destination address fields and said step of determining on which one of the buses the data packet is to be transmitted is determined with reference to a destination address in the destination address field.

13. A method as claimed in claim 12 wherein said data packets include access control fields having at least one request subfield and wherein said request flags are transmitted in said request subfields.

14. A method as claimed in claim 1 wherein there are two of said request subfields in each access control field denoting different priorities for transmission of data products.

15. A method as claimed in claim 1 including the steps of:
    incrementing the count of first counter means of each of the access units in response to receipt of request flags on the second bus from access units upstream of the respective access units;
    decrementing the count of the first counter means of each of the access units in response to receipt of empty or available packets on said first bus from access units upstream of respective access units;

transferring the count of the first counter means to second counter means of an access unit when that access unit has a packet queued for transmission on the first bus;

decrementing the count of the second counter means in response to receipt of empty or available packets on said first bus from access units upstream of that access unit; and transmitting data packets from access units on the first bus in accordance with the counts of said second counter means.

16. A method as claimed in claim 15 wherein the transmission of data packets on the first bus occurs when empty or available data packets are received at access units, the second counters of which have been decremented to zero.

17. A method as claimed in claim 15 wherein the first counters of respective access units are reset after the count of the first counter means has been transferred to the second counter.

18. A method as claimed in claim 15 wherein the first counters of respective access units are reset to zero each time after the count of the first counter means has been transferred to the second counter.

19. A method as claimed in claim 15 wherein the first counters of the respective access units are reset to selected values after the said transferring of the counts thereof.

20. A method as claimed in claim 15 wherein after the count of the first counter means has been transferred to said second counter means and before the transmission of the queued data packet at the access unit has been transmitted on the first bus, the first counter means is not decremented in response to receipt of empty or available data packets on said first bus.

21. A method as claimed in claim 1 including the steps of:

incrementing the counts of first request flag counter means of the access units in response to receipt of request flags on the second bus from access units upstream of respective access units;

decrementing the counts of the first request flag counter means of the access units in response to receipt of empty or available data packets on said first bus from access units upstream of respective access units;

incrementing the counts of second request flag counter means of the access units in response to receipt of request flags on the first bus from access units upstream of respective access units;

decrementing the counts of the second request flag counter means of the access units in response to receipt of empty or available data packets on said second bus from access units upstream of respective access units;

transferring the count of the first request flag counter means to first countdown counter means of an access unit when that access unit has a data packet for transmission on the first bus;

decrementing the counts of the first countdown counter means in response to receipt of empty or available data packets on said first bus from access units upstream of that access unit;

transferring the count of the second request flag counter means to second countdown counter means of an access unit when that access unit has a data packet for transmission on the second bus;

decrementing the count of the second countdown counter means in response to receipt of empty or available data packets on said second bus from access units upstream of that access unit; and transmitting data packets from access units on the first and second buses respectively in accordance with the counts of said first and second countdown counter means.

22. A method as claimed in claim 21 wherein the transmission of data on the first bus occurs when empty or available data packets on the first bus are received at access units, the first countdown counter means of which have been decremented to zero, and the transmission of data packets on the second bus occurs when empty or available data packets on the second bus are received at access units, the second countdown counter means of which have been decremented to zero.

23. A method as claimed in claim 21 wherein the first and second request flag counter means of access units are reset respectively after the counts thereof have been transferred to the first and second countdown counters.

24. A method as claimed in claim 21 wherein the and second request flag counter means of access units are reset zero respectively each time after the counts thereof have been transferred to the first and second countdown counters.

25. A method as claimed in clam 21 wherein the first and second request flag counter means of access units are reset selected values respectively after the said transferring of the counts thereof.

26. A method as claimed in claim 1 including the steps of:

incrementing the count of a first request flag counter means at each access unit in response to receipt of a request flag on the second bus from access units upstream of respective access units;

decrementing the count of the first request flag counter means at each access unit in response to receipt of empty or available data packets on said first bus from access units upstream of respective access units;

incrementing the count of a second request flag counter means at each access unit in response to receipt of a request flag on the first bus from access units upstream of respective access units;

decrementing the count of the second request flag counter means at each access unit in response to receipt of empty or available data packets on said second bus from access units upstream of respective access units;

transferring the count of the first request flag counter means to first countdown counter means of an access unit when that access unit has a data packet queued for transmission on the first bus; decrementing the count of the first countdown counter means in response to receipt of empty or available data packets on said first bus from access units upstream of that access unit;

transferring the count of the second request flag counter means to second countdown counter means of an access unit when that access unit has a data packet queued for transmission on the second bus; decrementing the count of the second countdown counter means in response to receipt of empty or available data packets on said second bus from access units upstream of that access unit; and controlling the transmission of data packets from access units on the first and second buses respectively in accordance with the counts of said first and second countdown counter means.

27. A communications network for queued transmission of information in data packets, said network comprising:

first and second oppositely directed unidirectional buses; and a plurality of access units coupled between the buses, said access units producing request flags on the buses when they have data packets for transmission thereon, said access units including:
(a) means for determining on which one of the buses the data packet is to be transmitted,
(b) request flag generating means for transmitting a request flag on the other of the buses, and
(c) logic means for selecting an empty or available data packet on said one bus for transmission of the data packet from the access unit with reference to the number of empty or packets available packets received at the access unit on said one bus and the number of request flags received at the access unit on said other bus.

28. A network as claimed in claim 27 wherein the logic means includes counter means the count of which is incremented in response to receipt of received request flags and decremented in response to empty or available packets, and wherein the transmitting means is responsive to the count of said counting means.

29. A network as claimed in claim 27 wherein said logic means includes:
(a) monitoring means responsive to received request flags and empty or available data packets;
(b) counter means coupled to said monitoring means, said counter means including at least first and second counters, the count of the first counter being selectively altered in response to received request flags and empty or available data packets;
(c) control means for transferring the count of the first counter to the second counter when the access unit has a data packet for transmission on the first bus and thereafter to decrement the count of the second counter on receipt of request flags on the first bus; and
wherein said access unit is operable to transmit data packets on said first bus in accordance with the value of the count in the second counter.

30. A network as claimed in claim 29 wherein the logic means resets the first counter after its count has been transferred to the second counter.

31. A network as claimed in claim 29 wherein the logic means resets the first counter to zero each time its count has been transferred to the second counter.

32. A network as claimed in claim 29 wherein the logic means resets the first counter to a selected value after its count has been transferred to the second counter.

33. A network as claimed in claim 29 wherein said access units include:
(a) first monitoring means responsive to received request flags and empty or available data packets;
(b) first countdown counter means and first request flag counter means which are responsive to said first monitoring means, the count of the first request flag counter means being incremented on receipt of request flags on the second bus from access units upstream of that access unit and decremented on receipt of empty or available data packets on said first bus from access units upstream of that access unit;
(c) first request flag generating means for generating a request flag on the second bus when the access unit has a data packet for transmission on said first bus;
(d) second monitoring means responsive to received request flags and empty or available data packets;
(e) second countdown counter means and second request flag counter means which are responsive to said second monitoring means, the count of the second request flag counter means being incremented on receipt of request flags on the first bus from access units upstream of that access unit and decremented on receipt of empty or available data packets on said second bus from access units upstream of that access unit;
(f) second request flag generating means for generating a request flag on the first bus when the access unit has a data packet for transmission on said second bus;
(g) control means for transferring respectively the counts of the first and second request flag counters to the first and second countdown counters when the access unit has a data packet for transmission on the first and second buses respectively and thereafter to decrement the counts of the first and second countdown counters on receipt of request flags on the first and second buses respectively; and
wherein said access unit is operable to transmit data packets on said first and second buses in accordance with the values of the counts in said first and second countdown counter means respectively.

34. A network as claimed in claim 33 wherein the logic means resets respectively the first and second request flag counter means after their counts have been transferred to the first and second countdown counter means.

35. A network as claimed in claim 33 wherein the logic means resets to zero respectively the first and second request flag counter means each time their counts have been transferred to the first and second countdown counter means.

36. A network as claimed in claim 33 wherein the logic means resets to selected values the first and second request flag counter means respectively after their counts have been transferred to the first and second countdown counter means.

37. An access unit for transmission of information in packets, in a network which includes first and second oppositely directed unidirectional buses, said access unit including:
(a) determining means for determining on which one of the buses a data packet is to be transmitted;
(b) request flag generating means for generating a request flag for transmission on the second bus when the access unit has a data packet for transmission on the first bus; and
(c) logic means for selecting an empty or available data packet on said one bus for transmission of the data packet from the access unit with reference to the number of empty or available packets received at the access unit on said one bus and the number of request flags received at the access unit on said other bus.

38. An access unit as claimed in claim 37 wherein including monitoring means responsive to received request flags and empty or available data packets; counter means responsive to said monitoring means, said counter means including at least first and second counters, the count of the first counter being selectively altered in response to received request flags and empty or available data packets; and wherein the logic means transfers the count of the first counter to the second counter when the access unit has a data packet for transmission on the first bus and thereafter to decrement the count of the second counter on receipt of request flags on the first bus; and control means responsive to the second counter and operable control transmission of data packets from the access unit on said first bus in accordance with the value of the count in the second counter.

39. An access unit as claimed in claim 38 wherein the logic means resets the first counter after its count has been transferred to the second counter.

40. An access unit as claimed in claim 39 wherein the logic means resets the first counter to zero each time its count has been transferred to the second counter.

41. An access unit as claimed in claim 39 wherein the logic means resets the first counter to a selected value after its count has been transferred to the second counter.

42. An access as claimed in claim 38 wherein there are first and second of said request flag generating means, first and second of said monitoring means and first and second of said counter means and wherein:

the first countdown counter means and first request flag counter means which are responsive to said first monitoring means, the count of the first request flag counter means being incremented on receipt of request flags on the second bus and decremented on receipt of empty or available data packets on said first bus;

the first request flag generating means generates a request flag for transmission on the second bus when the access unit has a data packet for transmission on said first bus;

the second monitoring means is responsive to received request flags and empty or available data packets;

the second countdown counter means and second request flag counter means which are responsive to said second monitoring means, the count of the second request flag counter means being incremented on receipt of request flags on the first bus and decremented on receipt of empty or available data packets on said second bus;

the second request flag generating means generates a request flag for transmission on the first bus when the access unit has a data packet for transmission on said second bus;

the logic means transfers respectively the counts of the first and second request flag counters to the first and second countdown counters when the access unit has a data packet for transmission on the first and second buses respectively and thereafter to decrement the counts of the first and second countdown counters on receipt of request flags on the first and second buses respectively; and the control means is responsive to the first and second countdown counter means and operable to control transmission of data packets from the access unit on said first and second buses in accordance with the values of the counts in said first and second countdown counter means respectively.

43. An access unit as claimed in claim 42 wherein the logic means resets respectively the first and second request flag counter means after their counts have been transferred to the first and second countdown counter means.

44. An access unit as claimed in claim 42 wherein the logic means resets to zero respectively the first and second request flag counter means each time their counts have been transferred to the first and second countdown counter means.

45. An access unit as claimed in claim 42 wherein the logic means resets the first and second request flag counter means to selected values after their respective counts have been transferred to the first and second countdown counter means.

* * * * *